(12) United States Patent
Blakley, III et al.

(10) Patent No.: US 7,219,154 B2
(45) Date of Patent: May 15, 2007

(54) METHOD AND SYSTEM FOR CONSOLIDATED SIGN-OFF IN A HETEROGENEOUS FEDERATED ENVIRONMENT

(75) Inventors: George Robert Blakley, III, Round Rock, TX (US); Heather Maria Hinton, Austin, TX (US); Anthony Joseph Nadalin, Austin, TX (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/334,325

(22) Filed: Dec. 31, 2002

(65) Prior Publication Data

US 2004/0128393 A1 Jul. 1, 2004

(51) Int. Cl.
*G06F 15/16* (2006.01)
(52) U.S. Cl. ...................................... 709/229; 709/227
(58) Field of Classification Search ................ 709/225, 709/229
See application file for complete search history.

(56) References Cited

U.S. PATENT DOCUMENTS

| | | | |
|---|---|---|---|
| 4,395,755 A | 7/1983 | Wakai | 364/200 |
| 5,586,260 A | 12/1996 | Hu | 395/200.2 |
| 5,596,744 A | 1/1997 | Dao et al. | 395/610 |
| 5,684,950 A | 11/1997 | Dare et al. | 395/187.01 |
| 5,968,126 A * | 10/1999 | Ekstrom et al. | 709/225 |
| 6,070,244 A | 5/2000 | Orchier et al. | 713/201 |
| 6,178,505 B1 | 1/2001 | Schneider et al. | 713/168 |
| 2002/0099809 A1* | 7/2002 | Lee | 709/223 |
| 2003/0158945 A1* | 8/2003 | Liu | 709/227 |
| 2004/0158743 A1* | 8/2004 | Ham et al. | 713/201 |

FOREIGN PATENT DOCUMENTS

EP 001089516 A2 * 4/2001

* cited by examiner

*Primary Examiner*—Jason Cardone
*Assistant Examiner*—Minh-Chau N. Nguyen
(74) *Attorney, Agent, or Firm*—Joseph R. Burwell; Jeffrey S. LaBaw

(57) ABSTRACT

A method is presented in which federated domains interact within a federated environment. Domains within a federation can initiate federated single-sign-on operations for a user at other federated domains. A point-of-contact server within a domain relies upon a trust proxy within the domain to manage trust relationships between the domain and the federation. Trust proxies interpret assertions from other federated domains as necessary. Trust proxies may have a trust relationship with one or more trust brokers, and a trust proxy may rely upon a trust broker for assistance in interpreting assertions. When a user requests to logoff from a domain that has initiated federated single-sign-on operations for the user at other federated domains, the domain initiates a consolidated logoff operation by requesting logoff operations at those other federated domains, which may also initiate logoff operations in a cascaded fashion to the domains at which they have initiated federated single-sign-on operations.

36 Claims, 11 Drawing Sheets

*FIG. 2B*
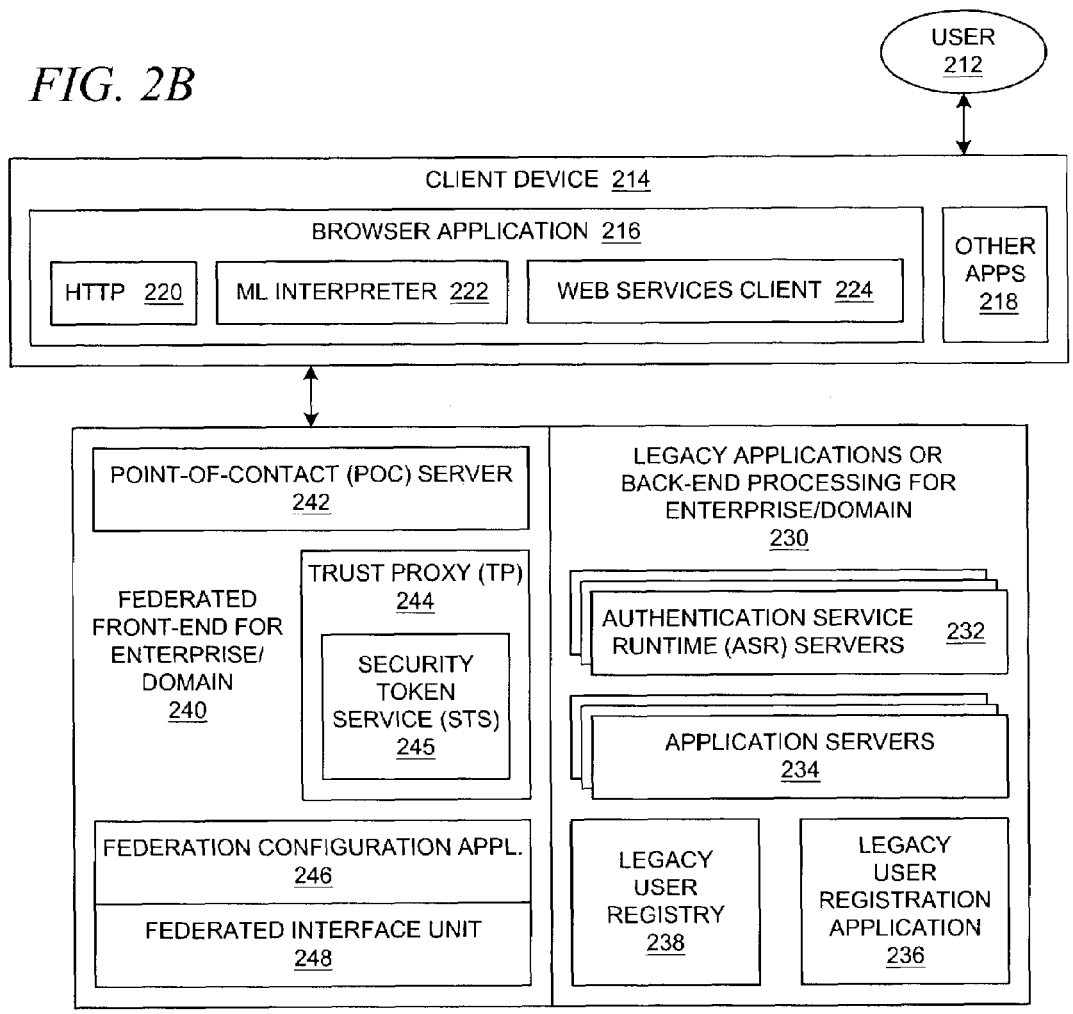
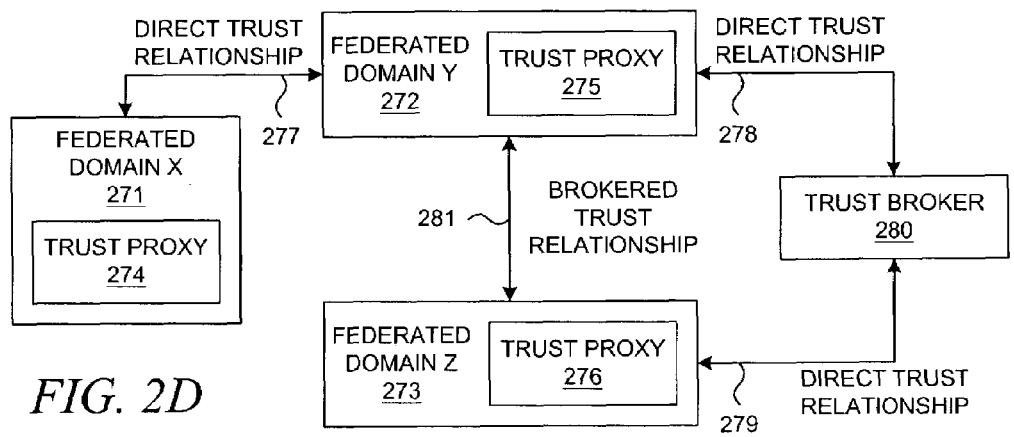
*FIG. 2D*

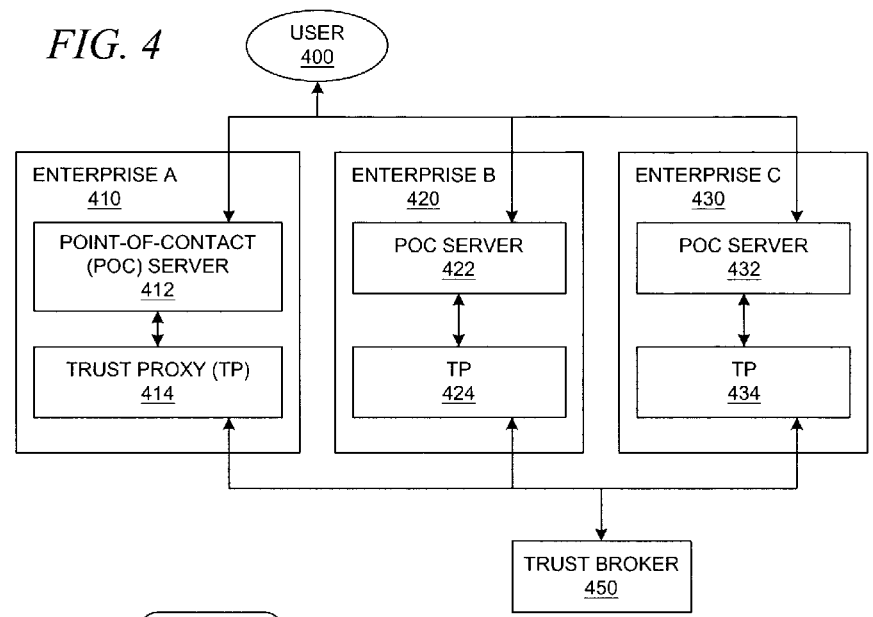

METHOD AND SYSTEM FOR CONSOLIDATED SIGN-OFF IN A HETEROGENEOUS FEDERATED ENVIRONMENT

CROSS-REFERENCE TO RELATED APPLICATIONS

The present application is related to the following applications with a common assignee:

U.S. patent application Ser. No. 10/334,274, filed Dec. 31, 2002, titled "Method and System for Proof-of-Possession Operations Associated with Authentication Assertions in a Heterogeneous Federated Environment";

U.S. patent application Ser. No. 10/334,273, filed Dec. 31, 2002, titled "Local Architecture for Federated Heterogeneous System";

U.S. patent application Ser. No. 10/334,539, filed Dec. 31, 2002, titled "Method and System for Attribute Exchange in a Heterogeneous Federated Environment";

U.S. patent application Ser. No. 10/334,284, filed Dec. 31, 2002, titled "Method and System for Authentication in a Heterogeneous Federated Environment"; and U.S. patent application Ser. No. 10/334,275, filed Dec. 31, 2002, titled "Method and System for Native Authentication Protocols in a Heterogeneous Federated Environment".

BACKGROUND OF THE INVENTION

1. Field of the Invention

The present invention relates to an improved data processing system and, in particular, to a method and apparatus for multicomputer data transferring. Still more particularly, the present invention is directed networked computer systems.

2. Description of Related Art

Enterprises generally desire to provide authorized users with secure access to protected resources in a user-friendly manner throughout a variety of networks, including the Internet. Although providing secure authentication mechanisms reduces the risks of unauthorized access to protected resources, the same authentication mechanisms may become barriers to user interaction with the protected resources. Users generally desire the ability to jump from interacting with one application to another application without regard to the authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by some computer system, the authentication should be valid throughout the user's working session, or at least for a particular period of time, without regard to the various computer architecture boundaries that are almost invisible to the user. Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications have a Web-based user interface that is accessible through a common browser, users expect more user-friendliness and low or infrequent barriers to movement from one Web-based application to another. In this context, users are coming to expect the ability to jump from interacting with an application on one Internet domain to another application on another domain without regard to the authentication barriers that protect each particular domain. However, even if many systems provide secure authentication through easy-to-use, Web-based interfaces, a user may still be forced to reckon with multiple authentication processes that stymie user access across a set of domains. Subjecting a user to multiple authentication processes in a given time frame may significantly affect the user's efficiency.

Various techniques have been used to reduce authentication burdens on users and computer system administrators. These techniques are generally described as "single-sign-on" (SSO) processes because they have a common purpose: after a user has completed a sign-on operation, i.e. been authenticated, the user is subsequently not required to perform another authentication operation. Hence, the goal is that the user would be required to complete only one authentication process during a particular user session.

Such single-sign-on solutions have been successful when implemented within a given enterprise. However, the barriers that are presented by multiple authentication processes or systems are becoming increasingly common as more enterprises participate in e-commerce marketplaces or other collaborative endeavors connected by the Internet. Previous single-sign-on solutions between enterprises have been limited to homogeneous environments in which there are pre-established business agreements between participating enterprises. These business agreements are used, in part, to establish trust and to limit and define how information is transferred in a secure manner between enterprises. These business agreements also include technological agreements on rules on how to translate, or map, user identities from one enterprise to another, and how to transfer the information used to vouch for users between participating enterprises.

In other words, previous single-sign-on solutions allow one enterprise to trust an authentication assertion (along with the identity of the user provided in the assertion) produced by a different enterprise based on the pre-negotiated or pre-configured agreements. Each distinct enterprise knows how to create and interpret authentication assertions that can be understood by other enterprises that have exchanged similar agreements, such as enterprises within an e-commerce marketplace. These homogeneous environments are tightly coupled because there is a deterministic relationship known by the enterprises for mapping the user identities across these systems. This tight coupling is possible because of the business agreements that are used to establish the single-sign-on environment. Although participating enterprises may cooperate within homogeneous environments by using these previous single-sign-on solutions, these environments are restrictive in view of the need or desire to interconnect multiple homogeneous environments, e.g., interconnected e-commerce marketplaces.

In addition, only part of securing a system is the requirement that a user complete an authentication operation to prove their identity to the system. An equally important part of this process is the requirement that a user complete a logoff operation in order to end a secure session, thereby preventing other users from stealing or otherwise maliciously interfering with a valid session. Therefore, it would be advantageous to have methods and systems in which enterprises can provide similar single-sign-on and similar single-sign-off experiences to users in the absence of pre-determined business and technical translation agreements between participating enterprises.

SUMMARY OF THE INVENTION

A method, apparatus, system, and computer program product are presented in which federated domains interact within a federated environment. Domains within a federation are able to initiate federated single-sign-on operations for a user at other federated domains. A point-of-contact server within a domain relies upon a trust proxy within the domain to manage trust relationships between the domain and the federation. Trust proxies interpret assertions from other federated domains as necessary. Trust proxies may have a trust relationship with one or more trust brokers, and a trust proxy may rely upon a trust broker for assistance in interpreting assertions. When a user requests to logoff from a domain that has initiated federated single-sign-on operations for the user at other federated domains, the domain initiates a consolidated logoff operation by requesting logoff operations at those other federated domains, which may also initiate logoff operations in a cascaded fashion to the domains at which they have initiated federated single-sign-on operations. A publish-and-subscribe model is also supported in which a domain may subscribe to logoff events for a particular user.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2B depicts a block diagram that illustrates the integration of pre-existing systems at a given domain with some of the federated architecture components of the present invention in accordance with an embodiment of the present invention;

FIG. 2D depicts a block diagram that illustrates an exemplary set of trust relationships between federated domains using trust proxies and a trust broker in accordance with the present invention;

FIG. 4 depicts a block diagram that illustrates a federated environment that supports federated single-sign-on operations;

FIGS. 7A–7B depicts a pair of flowcharts that show a pair of processes for performing a consolidated logoff operation among federated domains with a SOAP approach using a publish-and-subscribe model.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
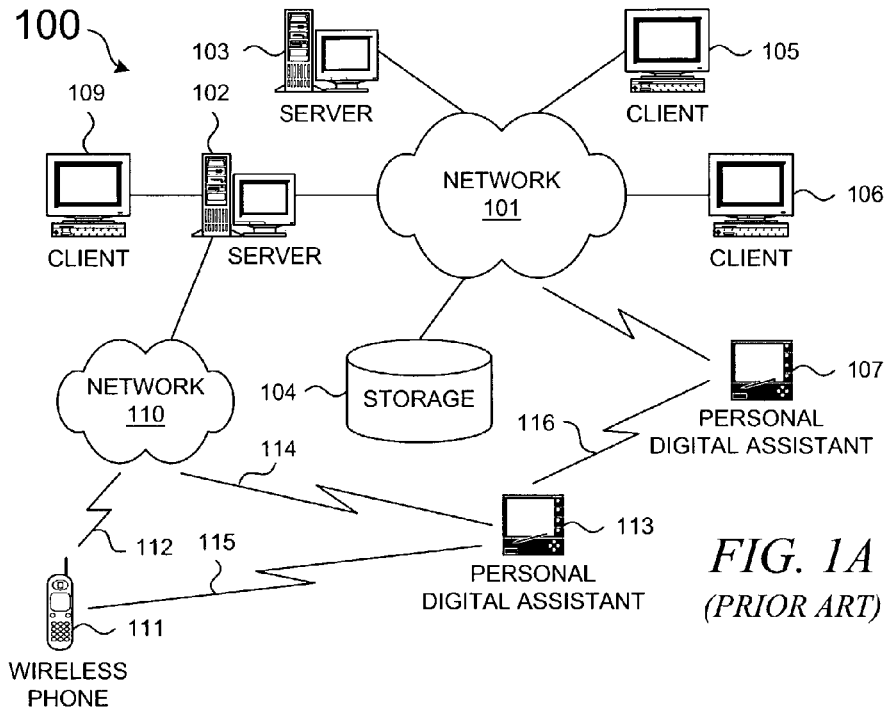
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc.. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
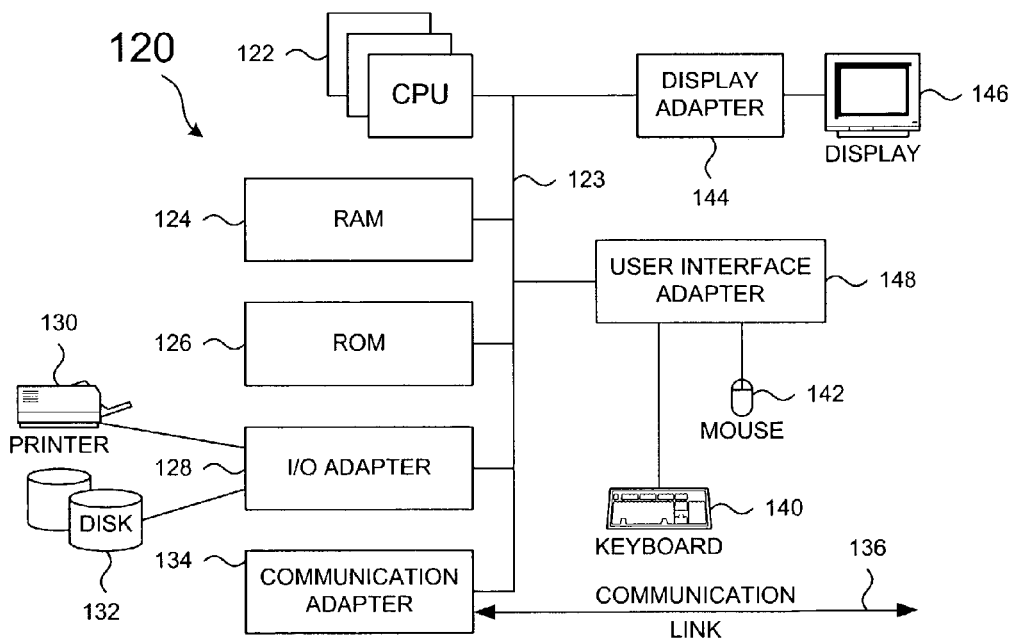
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
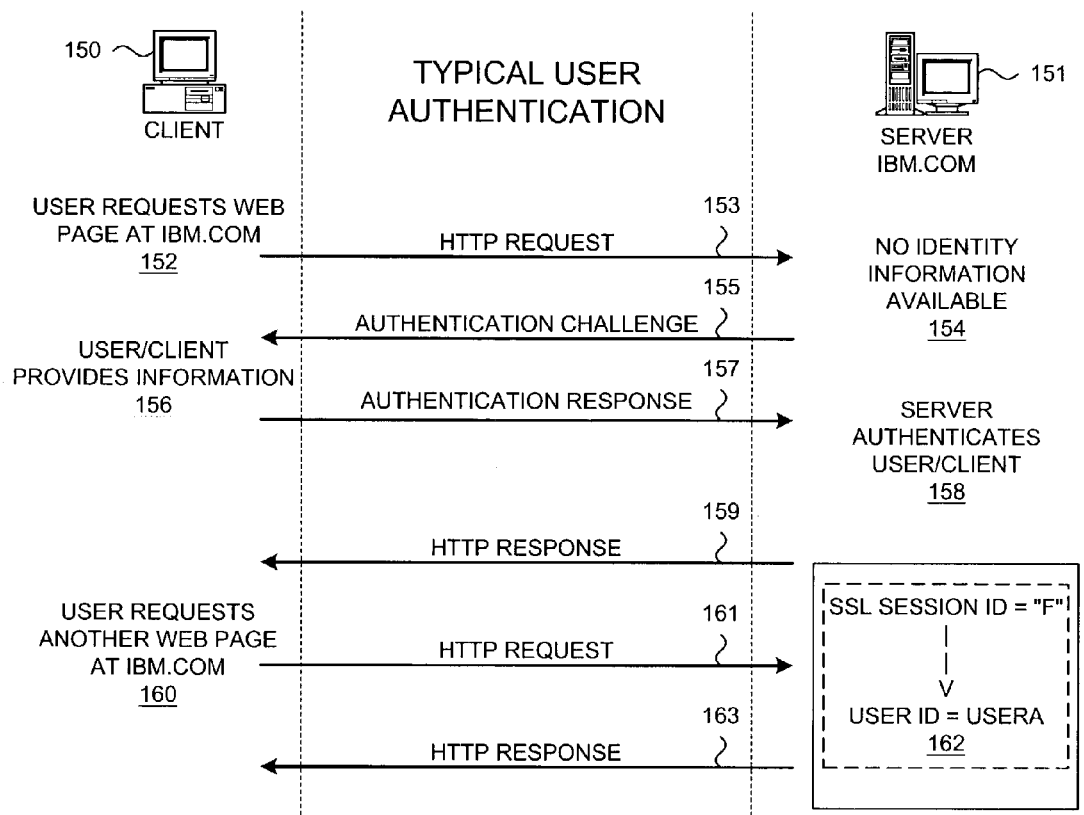
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's Web browser executing on the client workstation. A protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and server may be a Web Application Server (WAS), a server application, a servlet process, or the like.

The process is initiated when the user requests the protected resource, such as a Web page within the domain "ibm.com" (step 152). The Web browser (or associated application or applet) generates an HTTP request message that is sent to the Web server that is hosting the domain "ibm.com" (step 153). The server determines that it does not have an active session for the client (step 154), so the server requires the user to perform an authentication process by sending the client some type of authentication challenge (step 155). The authentication challenge may be in various formats, such as a Hypertext Markup Language (HTML) form. The user then provides the requested or required information (step 156), such as a user identifier and an associated password, or the client may automatically return certain information.

The authentication response information is sent to the server (step 157), at which point the server authenticates the user or client (step 158), e.g., by retrieving previously submitted registration information and matching the presented authentication information with the user's stored information. Assuming the authentication is successful, an active session is established for the authenticated user or client.

The server then retrieves the requested Web page and sends an HTTP response message to the client (step 159). At that point, the user may request another page within "ibm.com" (step 160) within the browser by clicking a hypertext link, and the browser sends another HTTP Request to the server (step 161). At that point, the server recognizes that the user has an active session (step 162), and the server sends the requested Web page back to the client in another HTTP response message (step 163). Although FIG. 1C depicts a typical prior art process, it should be noted that other alternative session state management techniques may be depicted, such as using cookies to identify users with active sessions, which may include using the same cookie that is used to provide proof of authentication.

Figure 1D:
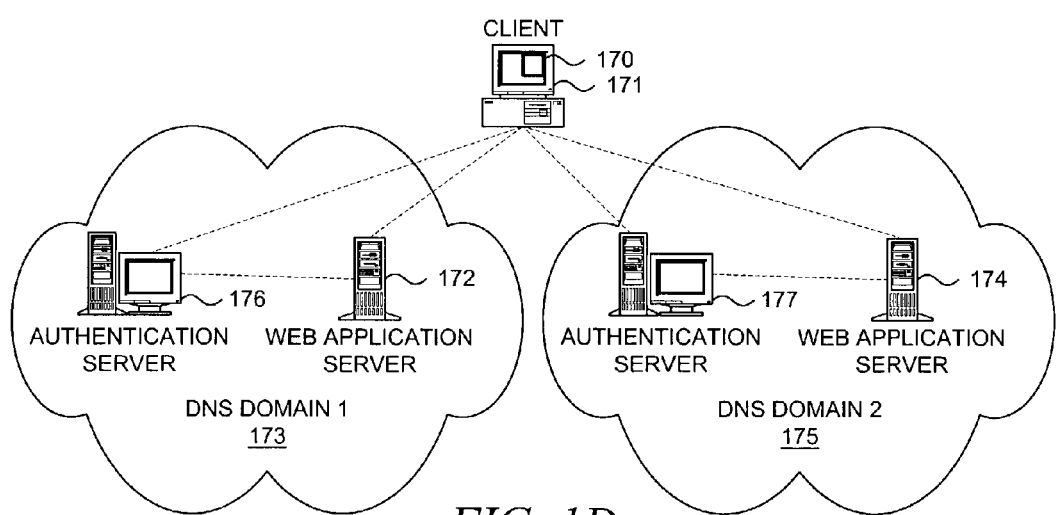
FIG. 1D depicts a network diagram that illustrates a typical Web-based environment in which the present invention may be implemented.

With reference now to FIG. 1D, a network diagram illustrates a typical Web-based environment in which the present invention may be implemented. In this environment, a user of a browser 170 at client 171 desires to access a protected resource on web application server 172 in DNS domain 173, or on web application server 174 in DNS domain 175.

In a manner similar to that shown in FIG. 1C, a user can request a protected resource at one of many domains. In contrast to FIG. 1C, which shows only a single server at a particular domain, each domain in FIG. 1D has multiple servers. In particular, each domain may have an associated authentication server 176 and 177.

In this example, after client 171 issues a request for a protected resource at domain 173, web application server 172 determines that it does not have an active session for client 171, and it requests that authentication server 176 perform an appropriate authentication operation with client 171. Authentication server 176 communicates the result of the authentication operation to web application server 172.

If the user (or browser 170 or client 171 on behalf of the user) is successfully authenticated, then web application server 172 establishes a session for client 171 and returns the requested protected resource. Typically, once the user is authenticated by the authentication server, a cookie may be set and stored in a cookie cache in the browser. FIG. 1D is merely an example of one manner in which the processing resources of a domain may be shared amongst multiple servers, particularly to perform authentication operations.

In a similar manner, after client 171 issues a request for a protected resource at domain 175, authentication server 177 performs an appropriate authentication operation with client 171, after which web application server 174 establishes a session for client 171 and returns the requested protected resource. Hence, FIG. 1D illustrates that client 171 may have multiple concurrent sessions in different domains yet is required to complete multiple authentication operations to establish those concurrent sessions.

Figure 1E:
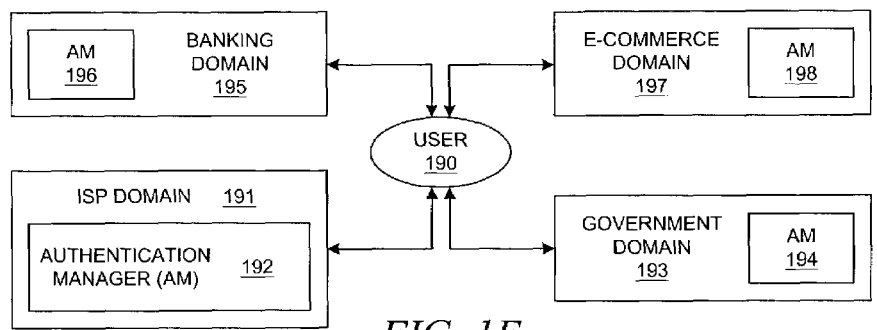
FIG. 1E depicts a block diagram that illustrates an example of a typical online transaction that might require multiple authentication operations from a user.

With reference now to FIG. 1E, a block diagram depicts an example of a typical online transaction that might require multiple authentication operations from a user. Referring again to FIG. 1C and FIG. 1D, a user may be required to complete an authentication operation prior to gaining access to a controlled resource, as shown in FIG. 1C. Although not shown in FIG. 1C, an authentication manager may be deployed on server 151 to retrieve and employ user information that is required to authenticate a user. As shown in FIG. 1D, a user may have multiple current sessions within different domains 173 and 175, and although they are not shown in FIG. 1D, each domain may employ an authentication manager in place of or in addition to the authentication servers. In a similar manner, FIG. 1E also depicts a set of domains, each of which support some type of authentication manager. FIG. 1E illustrates some of the difficulties that a user may experience when accessing multiple domains that require the user to complete an authentication operation for each domain.

User 190 may be registered at ISP domain 191, which may support authentication manager 192 that authenticates user 190 for the purpose of completing transactions with respect to domain 191. ISP domain 191 may be an Internet Service Provider (ISP) that provides Internet connection services, email services, and possibly other e-commerce services. Alternatively, ISP domain 191 may be an Internet portal that is frequently accessed by user 190.

Similarly, domains 193, 195, and 197 represent typical web service providers. Government domain 193 supports authentication manager 194 that authenticates users for completing various government-related transactions. Banking domain 195 supports authentication manager 196 that authenticates users for completing transactions with an online bank. E-commerce domain 197 supports authentication manager 198 that authenticates users for completing online purchases.

As noted previously, when a user attempts to move from one domain to another domain within the Internet or World Wide Web by accessing resources at the different domains, a user may be subjected to multiple user authentication requests or requirements, which can significantly slow the user's progress across a set of domains. Using FIG. 1E as an exemplary environment, user 190 may be involved in a complicated online transaction with e-commerce domain 197 in which the user is attempting to purchase an on-line service that is limited to users who are at least 18 years old and who have a valid driver license, a valid credit card, and a U.S. bank account. This online transaction may involve domains 191, 193, 195, and 197.

Typically, a user might not maintain an identity within each domain that participates in a typical online transaction. In this example, user 190 may have registered his or her identity with the user's ISP, but to complete the online transaction, the user might also be required to authenticate to domains 193, 195, and 197. If each of the domains does not maintain an identity for the user, then the user's online transaction may fail. Even if the user can be authenticated by each domain, then it is not guaranteed that the different domains can transfer information between themselves in order to complete the user's transaction. For user 190 shown in FIG. 1E, there is no prior art environment that allows user 190 to authenticate to a first web site, e.g., ISP 191, and then transfer an authentication token to other web service providers, such as domains 193, 195, and 197, for single-sign-on purposes.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used in the present invention. More information on Kerberos may be found in Kohl et al., "The Kerberos Network Authentication Service (V5)", Internet Engineering Task Force (IETF) Request for Comments (RFC) 1510, 09/1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used within the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc . . . An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Distinguishing Prior-art Single-sign-on Solutions

As noted above, prior-art single-sign-on solutions are limited to homogeneous environments in which there are pre-established business agreements between participating enterprises. These business agreements establish trust and define secure transfers of information between enterprises. These business agreements also include technological agreements on rules on how to translate, or map, user identities from one enterprise to another, and how to transfer the information used to vouch for users between participating enterprises.

In other words, previous single-sign-on solutions allow one enterprise to trust an authentication assertion (along with the identity of the user provided in the assertion) produced by a different enterprise based on the pre-negotiated or pre-configured agreements. Each distinct enterprise knows how to create and interpret authentication assertions that can be understood by other enterprises that have exchanged similar agreements, such as enterprises within an e-commerce marketplace. These homogeneous environments are tightly coupled because there is a deterministic relationship known by the enterprises for mapping the user identities across these systems. This tight coupling is possible because of the business agreements that are used to establish the single-sign-on environment.

Federation Model of Present Invention

In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should interoperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

In contrast to prior-art systems, the present invention provides a federation model for allowing enterprises to provide a single-sign-on experience to a user in the absence of specific, pre-established, business and technical agreements between particular enterprises. In other words, the present invention supports a federated, heterogeneous environment. As an example of an object of the present invention, referring again to FIG. 1E, user 190 is able to authenticate to domain 191 and then have domain 191 provide the appropriate assertions to each downstream domain that might be involved in a transaction. These downstream domains need to be able to understand and trust authentication assertions and/or other types of assertions, even though there are no pre-established assertion formats between domain 191 and these other downstream domains. In addition to recognizing the assertions, the downstream domains need to be able to translate the identity contained within an assertion to an identity that represents user 190 within a particular domain, even though there is no pre-established identity mapping relationship.

The present invention is directed to a federated environment. In general, an enterprise has its own user registry and maintains relationships with its own set of users. Each enterprise typically has its own means of authenticating these users. However, the federated scheme of the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the present invention, a federation is a set of distinct entities, such as enterprises, organizations, institutions, etc., that cooperate to provide a single-sign-on, ease-of-use experience to a user. In the present invention, a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationship with respect to the federation as a whole; the service provider does not need to manage authentication information, such as user password information, because it can rely on authentication that is accomplished by a user's authentication home domain.

The present invention also concerns a federated identity management system that establishes a foundation in which loosely coupled authentication, user enrollment, user profile management and/or authorization services, collaborate across security domains. Federated identity management allows services residing in disparate security domains to securely interoperate and collaborate even though there may be differences in the underlying security mechanisms and operating system platforms at these disparate domains. A single-sign-on experience is established once a user establishes their participation in a federation.

Home Domain, Issuing Party, and Relying Party

As explained in more detail further below, the present invention provides significant user benefits. The present invention allows a user to authenticate at a first entity, hereinbelow also referred to as the user's home domain or authentication home domain. This first entity may act as an issuing party, which issues an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user.

Figure 2A:
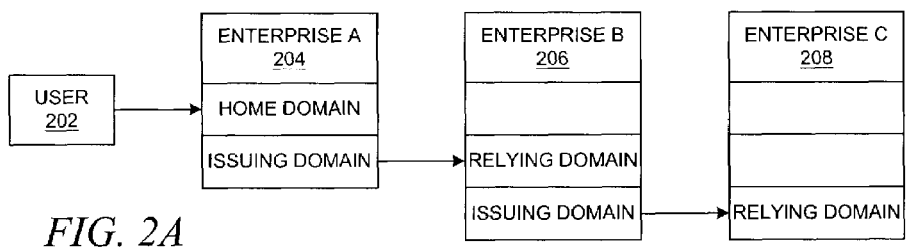
FIG. 2A depicts a block diagram that illustrates the terminology of the federated environment with respect to a transaction that is initiated by a user to a first federated enterprise, which, in response, invokes actions at downstream entities within the federated environment.

With reference now to FIG. 2A, a block diagram depicts the terminology of the federated environment with respect to a transaction that is initiated by a user to a first federated enterprise, which, in response, invokes actions at downstream entities within the federated environment. FIG. 2A shows that the terminology may differ depending on the perspective of an entity within the federation for a given federated operation. User 202 initiates a transaction through a request for a protected resource at enterprise 204. If user 202 has been authenticated by enterprise 204, then enterprise 204 is the user's home domain for this federated session. Assuming that the transaction requires some type of operation by enterprise 206 and enterprise 204 transfers an assertion to enterprise 206, then enterprise 204 is the issuing domain with respect to the particular operation, and enterprise 206 is the relying domain for the operation. Assuming that the transaction requires further operations and enterprise 206 transfers an assertion to enterprise 208, then enterprise 206 is the issuing domain with respect to the requested operation, and enterprise 208 is the relying domain for the operation.

In the federated environment of the present invention, the domain at which the user authenticates is termed the user's (authentication) home domain. The home domain maintains authentication credentials. The home domain may be the user's employer, the user's ISP, or some other service provider. It is possible that there may be multiple enterprises within a federated environment that could act as a user's home domain because there may be multiple enterprises that have the ability to generate and validate a user's authentication credentials.

From an authentication perspective, an issuing party for an authentication assertion is usually the user's authentication home domain. The user's home domain may or may not maintain personal information or profile information for the user. Hence, from an attribute perspective involving personally identifiable information, personalization information, or other user attributes, an issuing party for an attribute assertion may or may not be the user's authentication home domain, To avoid any confusion, separate terminology can be employed for attribute home domains and authentication home domains, but the term "home domain" hereinbelow may be interpreted as referring to an authentication home domain.

Within the scope of a given federated session, however, there is usually one and only one domain that acts as the user's home domain. Once a user has authenticated to this domain, all other domains or enterprises in the federation are treated as relying parties for the duration of that session.

Given that the present invention provides a federated infrastructure that can be added to existing systems while minimizing the impact on an existing, non-federated architecture, authentication at a user's home domain is not altered by the fact that the home domain may also participate within a federated environment. In other words, even though the home domain may be integrated into a federated environment that is implemented in accordance with the present invention, the user should have the same end-user experience while performing an authentication operation at the user's home domain. It should be noted, though, that not all of a given enterprise's users will necessarily participate in the federated environment.

Moreover, user registration, e.g., establishment of a user account, is not altered by the fact that the home domain may also participate within a federated environment. A user establishes an account at a domain through a registration process that is independent of a federated environment. In other words, the establishment of a user account at a home domain does not include the establishment of account information that is valid across a federation, e.g., identity translation information. If there is a single federated domain that is able to authenticate a user, i.e. there is one and only one domain within the federation with whom the user has registered, then this domain will always act as the user's home domain and may direct the user's movement throughout the federated environment.

If a user has multiple possible home domains within a federated environment, then a user may enter the federation via more than one entry point. In other words, the user may have accounts at multiple domains, and these domains do not necessarily have information about the other domains nor about a user's identity at the other domains.

While the domain at which the user authenticates is termed the home domain, the issuing domain is a federation entity that issues an assertion for use by another domain, i.e. the relying domain. An issuing domain is usually, but not necessarily, the user's home domain. Hence, it would usually be the case that the issuing party has authenticated the user through typical authentication protocols, as mentioned above. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any domain that has the ability to issue authentication assertions on behalf of a user can act as an issuing domain.

The relying domain is a domain that receives an assertion from an issuing party. The relying party is able to accept, trust, and understand an assertion that is issued by a third party on behalf of the user, i.e. the issuing domain. It is generally the relying party's duty to use an appropriate authentication authority to interpret an authentication assertion. In addition, it is possible that the relying party is able to authenticate a particular user, i.e. to act as a user's home domain, but it is also possible that a relying party may not be able to authenticate a particular user through conventional methods. Hence, a relying party is a domain or an enterprise that relies on the authentication assertion that is presented by a user and that provides a user with a single-sign-on experience instead of prompting the user for the user's authentication credentials as part of an interactive session with the user.

Federated Architecture—Federated Front-end for Legacy Systems

With reference now to FIG. 2B, a block diagram depicts the integration of pre-existing systems at a given domain with some of the federated architecture components of the present invention in accordance with an embodiment of the present invention. A federated environment includes federated entities that provide a variety of services for users. User 212 interacts with client device 214, which may support browser application 216 and various other client applications 218. User 212 is distinct from client device 214, browser 216, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 216 may be a typical browser that comprises many modules, such as HTTP communication component 220 and markup language (ML) interpreter 222. Browser application 216 may also support plug-ins, such as web services client 224, and/or downloadable applets, which may or may not require a virtual machine runtime environment. Web services client 224 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 212 may access web-based services using browser application 216, but user 212 may also access web services through other web service clients on client device 214. Some of the examples of the present invention that are shown in the following figures employ HTTP redirection via the user's browser to exchange information between entities in a federated environment. However, it should be noted that the present invention may be conducted over a variety of communication protocols and is not meant to be limited to HTTP-based communications. For example, the entities in the federated environment may communicate directly when necessary; messages are not required to be redirected through the user's browser.

The present invention may be implemented in a manner such that components that are required for a federated environment can be integrated with pre-existing systems. FIG. 2B depicts one embodiment for implementing these components as a front-end to a pre-existing system. The pre-existing components at a federated domain can be considered as legacy applications or back-end processing components 230, which include authentication service runtime (ASR) servers 232 in a manner similar to that shown in FIG. 2C. ASR servers 232 are responsible for authenticating users when the domain controls access to application servers 234, which can be considered to generate, retrieve, or otherwise process protected resources. The domain may continue to use legacy user registration application 236 to register users for access to application servers 234. Information that is needed to authenticate a registered user is stored in legacy user registry 238.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federated front-end processing 240, which includes point-of-contact server 242 and trust proxy server 244 (or more simply, trust proxy 244) which itself includes Security Token Service (STS) 245, all of which are described in more detail below with respect to FIG. 2C. Federation configuration application 246 allows an administrative user to configure the federated front-end components to allow them to interface with the legacy back-end components through federated interface unit 248.

Legacy or pre-existing authentication services at a given enterprise may use various, well known, authentication methods or tokens, such as username/password or smart card token-based information. However, with the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federated front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

Figure 2C:
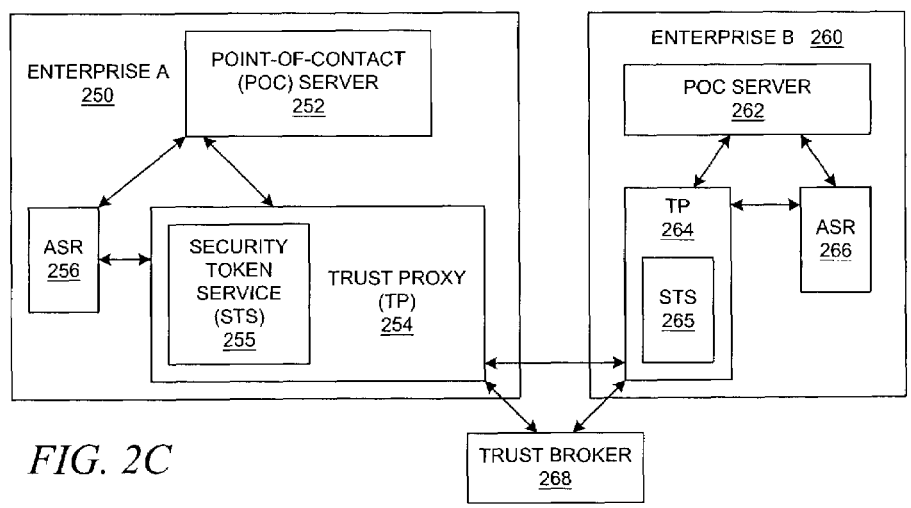
FIG. 2C depicts a block diagram that illustrates a federated architecture in accordance with an implementation of the present invention.

Federated Architecture—Point-of-contact Servers, Trust Proxies, and Trust Brokers With reference now to FIG. 2C, a block diagram depicts a federated architecture in accordance with an implementation of the present invention. A federated environment includes federated enterprises or similar entities that provide a variety of services for users. A user, through an application on a client device, may attempt to access resources at various entities, such as enterprise 250. A point-of-contact server at each federated enterprise, such as point-of-contact (POC) server 252 at enterprise 250, is the user's entry point into the federated environment. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication assertion conversion. For example, the point-of-contact server may translate HTTP or HTTPS messages to SOAP and vice versa. As explained in more detail further below, the point-of-contact server may also be used to invoke a trust proxy to translate authentication assertions, e.g., a SAML token received from an issuing party can be translated into a Kerberos token understood by a receiving party.

A trust proxy or a trust proxy server, such as trust proxy (TP) 254 at enterprise 250, establishes and maintains a trust relationship between two entities in a federation. A trust proxy generally has the ability to handle authentication token format translation (through the security token service, if configured as such; the security token service is described in more detail further below) from a format used by the issuing party to one understood by the receiving party.

Together, the use of a point-of-contact server and a trust proxy minimize the impact of implementing a federated architecture on an existing, non-federated set of systems. Hence, the federated architecture of the present invention requires the implementation of at least one point-of-contact server and at least one trust proxy per federated entity, whether the entity is an enterprise, a domain, or other logical or physical entity. The federated architecture of the present invention, though, does not necessarily require any changes to the existing, non-federated set of systems. Preferably, there is a single trust proxy for a given federated entity, but there may be multiple trust proxies for availability purposes, or there may be multiple trust proxies for a variety of smaller entities within a federated entity, e.g., separate subsidiaries within an enterprise. It is possible that a given entity could belong to more than one federation, although this scenario would not necessarily require multiple trust proxies as a single trust proxy could manage trust relationships within multiple federations.

One role of a trust proxy is to determine the required token type by another domain and/or the trust proxy in that domain. A trust proxy has the ability to handle authentication token format translation from a format used by the issuing party to one understood by the receiving party. Trust proxy 254 is also responsible for any user identity translation or attribute translation that occurs for enterprise 250. However, a trust proxy may invoke a trust broker for assistance, as described further below. Identity translation may be required to map a user's identity and attributes as known to an issuing party to one that is meaningful to a receiving party. This translation may be invoked by either a trust proxy at an issuing domain or a trust proxy at a receiving domain.

Trust proxy 254 may include an internalized component, shown as security token service (STS) component 255, which will provide token translation and will invoke authentication service runtime (ASR) 256 to validate and generate tokens. The security token service provides the token issuance and validation services required by the trust proxy. The security token service therefore includes an interface to existing authentication service runtimes, or it incorporates authentication service runtimes into the service itself. Rather than being internalized within the trust proxy, the security token service component may also be implemented as a stand-alone component, e.g., to be invoked by the trust proxy, or it may be internalized within the transaction server, e.g., as part of an application server.

For example, an STS component may receive a request to issue a Kerberos token. As part of the authentication information of the user for whom the token is to be created, the request may contain a binary token containing a username and password. The STS component will validate the username and password against, e.g., an LDAP runtime (typical authentication) and will invoke a Kerberos KDC (Key Distribution Center) to generate a Kerberos ticket for this user. This token is returned to the trust proxy for use within the enterprise; however, this use may include externalizing the token for transfer to another domain in the federation.

In a manner similar to that described with respect to FIG. 1D, a user may desire to access resources at multiple enterprises within a federated environment, such as both enterprise 250 and enterprise 260. In a manner similar to that described above for enterprise 250, enterprise 260 comprises point-of-contact server 262, trust proxy 264, security token service 265, and authentication service runtime 266. Although the user may directly initiate separate transactions with each enterprise, the user may initiate a transaction with enterprise 250 which cascades throughout the federated environment. Enterprise 250 may require collaboration with multiple other enterprises within the federated environment, such as enterprise 260, to complete a particular transaction, even though the user may not have been aware of this necessity when the user initiated a transaction. Enterprise 260 becomes involved as a downstream domain, and the present invention allows enterprise 250 to present a federated assertion to enterprise 260 if necessary in order to further the user's transaction.

It may be the case that a trust proxy does not know how to interpret the authentication token that is received by an associated point-of-contact server and/or how to translate a given user identity and attributes. In this case, the trust proxy may choose to invoke functionality at a trust broker component, such as trust broker 268. A trust broker maintains relationships with individual trust proxies, thereby providing transitive trust between trust proxies. Using a trust broker allows each entity within a federated environment, such enterprises 250 and 260, to establish a trust relationship with the trust broker rather than establishing multiple individual trust relationships with each domain in the federated environment. For example, when enterprise 260 becomes involved as a downstream domain for a transaction initiated by a user at enterprise 250, trust proxy 254 at enterprise 250 can be assured that trust proxy 264 at enterprise 260 can understand an assertion from trust proxy 254 by invoking assistance at trust broker 268 if necessary. Although FIG. 2C depicts the federated environment with a single trust broker, a federated environment may have multiple trust brokers.

It should be noted that although FIG. 2C depicts point-of-contact server 252, trust proxy 254, security token service component 255, and authentication service runtime 256 as distinct entities, it is not necessary for these components to be implemented on separate devices. For example, it is possible for the functionality of these separate components to be implemented as applications on a single physical device or combined in a single application. In addition, FIG. 2C depicts a single point-of-contact server, a single trust proxy, and a single security token server for an enterprise, but an alternative configuration may include multiple point-of-contact servers, multiple trust proxies, and multiple security token servers for each enterprise. The point-of-contact server, the trust proxy, the security token service, and other federated entities may be implemented in various forms, such as software applications, objects, modules, software libraries, etc..

A trust proxy/STS may be capable of accepting and validating many different authentication credentials, including traditional credentials such as a username and password combinations and Kerberos tickets, and federated authentication token formats, including authentication tokens produced by a third party. A trust proxy/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user.

A security token service invokes an authentication service runtime as necessary. The authentication service runtime supports an authentication service capable of authenticating a user. The authentication service acts as an authentication authority that provides indications of successful or failed authentication attempts via authentication responses. The trust proxy/STS may internalize an authentication service, e.g., a scenario in which there is a brand-new installation of a web service that does not need to interact with an existing legacy infrastructure. Otherwise, the STS component will invoke external authentication services for validation of authentication tokens. For example, the STS component could "unpack" a binary token containing a username/password and then use an LDAP service to access a user registry to validate the presented credentials.

When used by another component such as an application server, the STS component can be used to produce tokens required for single-sign-on to legacy authentication systems. Hence, the STS component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the STS component to translate a Kerberos ticket (as used internally by the Web application server) to a an IBM RACF® passticket required by the CICS transaction gateway.

The entities that are shown in FIG. 2C can be explained using the terminology that was introduced above, e.g., "issuing party" and "relying party". As part of establishing and maintaining trust relationships, an issuing party's trust proxy can determine what token types are required/accepted by a relying party's trust proxy. Thus, trust proxies use this information when invoking token services from a security token service. When an issuing domain's trust proxy is required to produce an authentication assertion for a relying party, the trust proxy determines the required token type and requests the appropriate token from the security token service.

When a relying domain's trust proxy receives an authentication assertion from an issuing party, the trust proxy knows what type of assertion that it expected and what type of assertion that it needs for internal use within the relying domain. The relying domain's trust proxy therefore requests that the security token service generate the required internal-use token based on the token in the received authentication assertion.

Both trust proxies and trust brokers have the ability to translate an assertion received from an issuing party into a format that is understood by a relying party. The trust broker has the ability to interpret the assertion format (or formats) for each of the trust proxies with whom there is a direct trust relationship, thereby allowing the trust broker to provide assertion translation between an issuing party and a relying party. This translation can be requested by either party through its local trust proxy. Thus, the issuing party's trust proxy can request translation of an assertion before it is sent to the relying party. Likewise, the relying party's trust proxy can request translation of an assertion received from an issuing party.

Assertion translation comprises user identity translation, authentication assertion translation, attribute assertion translation, or other forms of assertion translation. Reiterating the point above, assertion translation is handled by the trust components within a federation, i.e. trust proxies and trust brokers. A trust proxy may perform the translation locally, either at the issuing domain or at the relying domain, or a trust proxy may invoke assistance from a trust broker.

Assuming that an issuing party and a relying party already have individual trust relationships with a trust broker, the trust broker can dynamically create, i.e. broker, new trust relationships between issuing parties and relying parties if necessary. After the initial trust relationship brokering operation that is provided by the trust broker, the issuing party and the relying party may directly maintain the relationship so that the trust broker need not be invoked for future translation requirements. It should be noted that translation of authentication tokens can happen at three possible places: the issuing party's trust proxy, the relying party's trust proxy, and the trust broker. Preferably, the issuing party's trust proxy generates an authentication assertion that is understood by the trust broker to send to the relying party. The relying party then requests a translation of this token from the trust broker into a format recognizable by the relying party. Token translation may occur before transmission, after transmission, or both before and after transmission of the authentication assertion.

Trust Relationships within Federated Architecture

Within a federated environment that is implemented in accordance with the present invention, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain trust each other. In general, there are no business agreements required to establish trust within an enterprise because the deployed technology creates inherent trust within an enterprise, e.g., by requiring mutually authenticated SSL sessions between components. Referring to FIG. 2B, the legacy applications and back-end processing systems may represent an enterprise trust domain.

Federation trust domains are those that cross enterprise boundaries; from one perspective, a federation trust domain may represent trust relationships between distinct enterprise trust domains. Federation trust domains are established through trust proxies across enterprise boundaries. Federated trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process is implemented out-of-band as this process also includes the establishment of business agreements that govern an enterprise's participation in a federation and the liabilities associated with this participation.

There a number of mechanisms for establishing trust in a federated business model. In a federation model, a fundamental notion of trust between the federation participants is required for business reasons in order to provide a level of assurance that the assertions (including tokens and attribute information) that are transferred between the participants are valid. If there is no trust relationship, then the relying domain cannot depend upon the assertions received from the issuing domain; they cannot be used by the relying domain to determine how to interpret any information received from the issuing party.

For example, a large corporation may want to link several thousand global customers, and the corporation could use prior art solutions. As a first example, the corporation could require global customers to use a digital certificate from a commercial certificate authority to establish mutual trust. The commercial certificate authority enables the servers at the corporation to trust servers located at each of the global customers. As a second example, the corporation could implement third-party trust using Kerberos; the corporation and its global customers could implement a trusted third-party Kerberos domain service that implements shared-secret-based trust. As a third example, the corporation could establish a private scheme with a proprietary security message token that is mutually trusted by the servers of its global customers.

Any one of these approaches may be acceptable if the corporation needed to manage trust relationships with a small number of global customers, but this may become unmanageable if there are hundreds or thousands of potential federation partners. For example, while it may be possible for the corporation to force its smaller partners to implement a private scheme, it is unlikely that the corporation will be able to impose many requirements on its larger partners.

With the present invention, the enterprise will employ trust relationships established and maintained through trust proxies and possibly trust brokers. An advantage of the federated architecture of the present invention is that it does not impose additional requirements above and beyond the current infrastructures of an enterprise and its potential federation partners.

However, the present invention does not relieve an enterprise and its potential federation partners from the preliminary work required to establish business and liability agreements that are required for participation in the federation. In addition, the participants cannot ignore the technological bootstrapping of a trust relationship. The present invention allows this bootstrapping to be flexible, e.g., a first federation partner can issue a Kerberos ticket with certain information, while a second federation partner can issue a SAML authentication assertion with certain information.

In the present invention, the trust relationships are managed by the federation trust proxies, which may include a security token service that validates and translates a token that is received from an issuing party based on the pre-established relationship between two trust proxies. In situations where it is not feasible for a federated enterprise to establish trust relationships (and token translation) with another federated enterprise, a trust broker may be invoked. However, the federated enterprise must still establish a relationship with a trust broker.

With reference now to FIG. 2D, a block diagram depicts an exemplary set of trust relationships between federated domains using trust proxies and a trust broker in accordance with the present invention. Although FIG. 2C introduced the trust broker, FIG. 2D illustrates the importance of transitive trust relationships within the federated architecture of the present invention.

Federated domains 271–273 incorporate trust proxies 274–276, respectively. Trust proxy 274 has direct trust relationship 277 with trust proxy 275. Trust broker 280 has direct trust relationship 278 with trust proxy 275, and trust broker 280 has direct trust relationship 279 with trust proxy 276. Trust broker 280 is used to establish, on behalf of a federation participant, a trust relationship based on transitive trust with other federation partners. The principle of transitive trust allows trust proxy 275 and trust proxy 276 to have brokered trust relationship 281 via trust broker 280. Neither trust proxy 275 nor 276 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed by the present invention for specifying the details about the manner in which the trust relationships within a federation are implemented.

Assertion Processing within Federated Architecture

As noted above, a user's experience within a federation is governed in part by the assertions about the user or for the user that are transferred across domains. Assertions provide information about the user's authentication status, attribute information, and other information. Using authentication assertions can remove the need for a user to re-authenticate at every site that the user visits. Within a federated environment, there are two models to get an assertion from an issuing party to a relying party: push models and pull models. In a push model, the user's assertions travel with the user's request to the issuing party. In a pull model, the user's request is received at a relying party without any information, and the relying party then requests the relevant or required assertions from the issuing party.

Figure 3A:
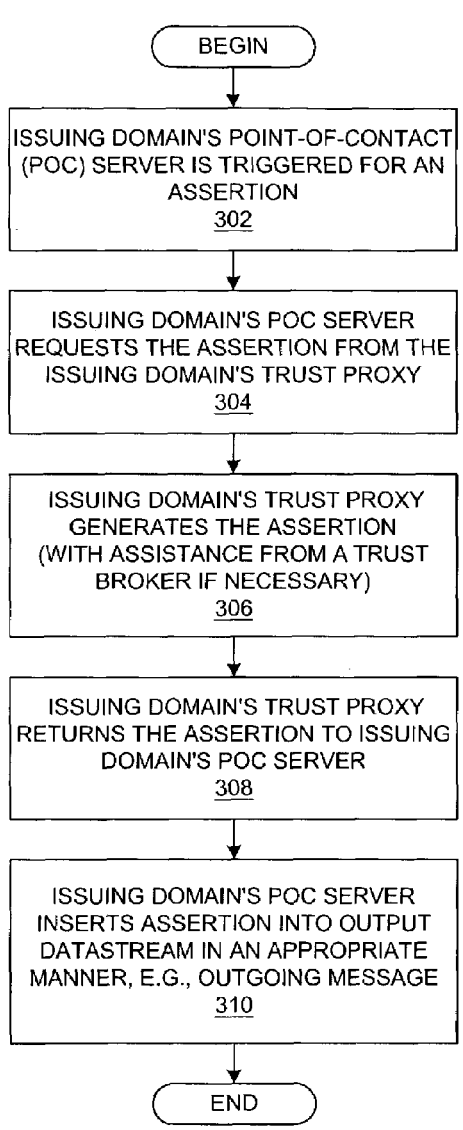
FIG. 3A depicts a flowchart that illustrates a generalized process at an issuing domain for creating an assertion within a federated environment.
Figure 3B:
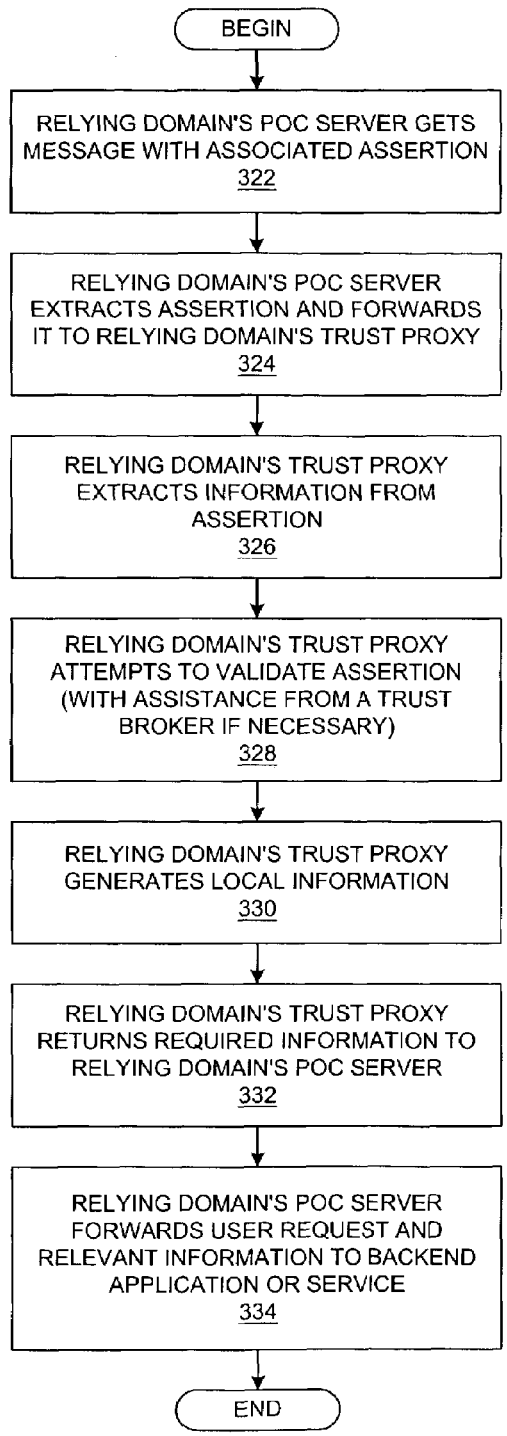
FIG. 3B depicts a flowchart that illustrates a generalized process at a relying domain for tearing down an assertion.
Figure 3C:
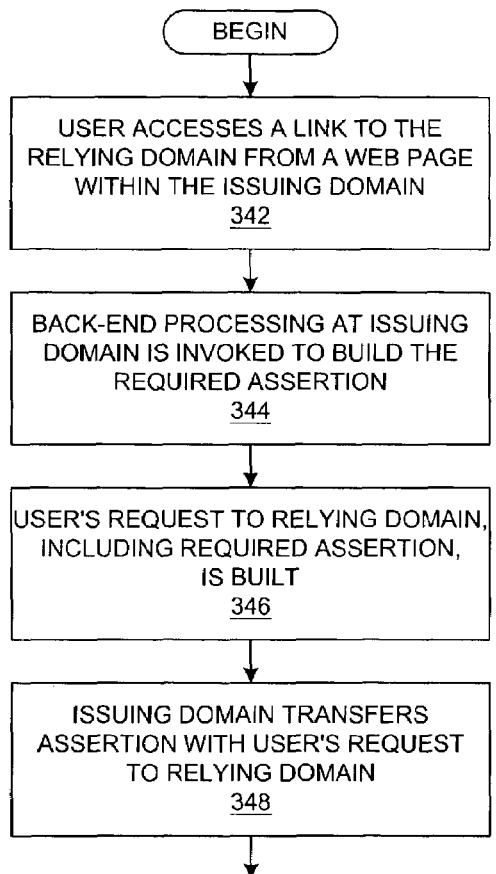
FIG. 3C depicts a flowchart that illustrates a specific process for pushing an assertion from an issuing domain to a relying domain in response to a user action at the issuing domain.
Figure 3D:
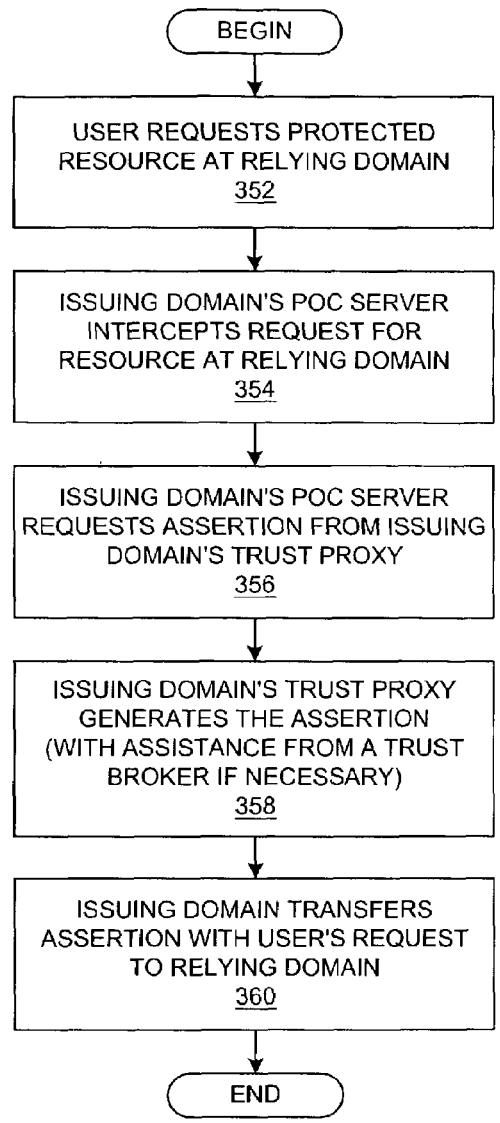
FIG. 3D depicts a flowchart that illustrates a specific process for pushing an assertion from an issuing domain to a relying domain in response to the issuing domain actively intercepting an outgoing request to the relying domain.
Figure 3E:
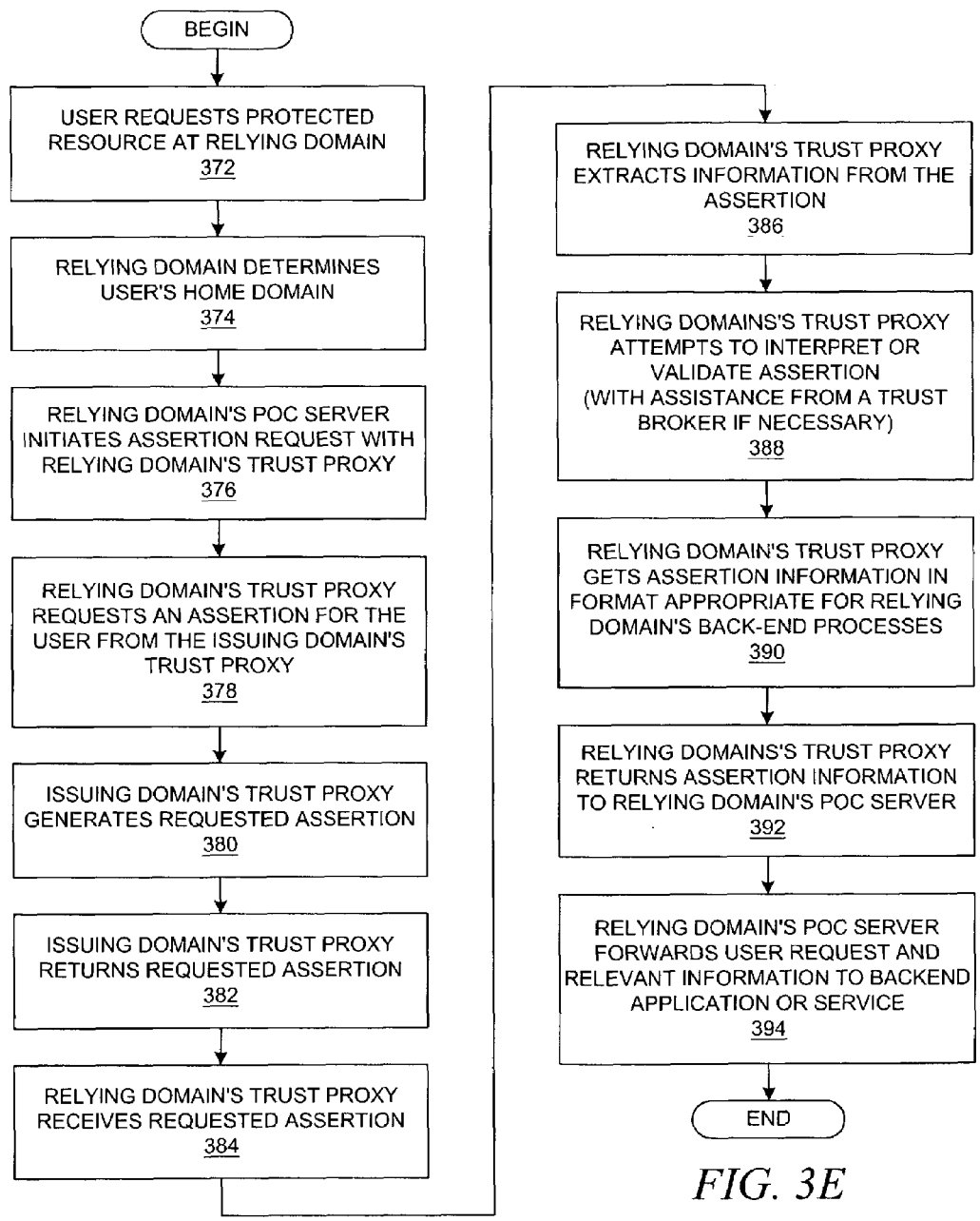
FIG. 3E depicts a flowchart that illustrates a pull model in which a relying domain requests any required assertions for a user from an issuing domain while attempting to satisfy a resource request that was received by the relying domain from the requesting user.

Given these models for using assertions within a federated environment, the description of the present invention now turns to a set of figures that describe a set of processes for creating and using assertions within the federated environment of the present invention. FIG. 3A depicts a generalized process at an issuing domain for creating an assertion within a federated environment, whereas FIG. 3B depicts a generalized process at a relying domain for "tearing down" an assertion, i.e. for reducing an assertion to its essential information by extracting and analyzing its information. FIG. 3C and FIG. 3D show more detailed processes for the generalized process that is shown in FIG. 3A by depicting two variants of a push model in which an assertion is produced within an issuing domain and is then transferred with a user's request to the relying domain. FIG. 3E depicts a pull model in which a relying domain requests any required assertions for a user from an issuing domain while attempting to satisfy a resource request that was received by the relying domain from the requesting user.

With reference now to FIG. 3A, a flowchart depicts a generalized process at an issuing domain for creating an assertion within a federated environment. The process begins when the issuing domain's point-of-contact server is triggered for an assertion (step 302). The point-of-contact server may receive a request for a particular assertion for a given user from a relying domain, or it may intercept an outgoing request to a known relying domain that requires an assertion; these scenarios are described in more detail below with respect to FIG. 3C and FIG. 3D, respectively. In response to being triggered for an assertion, the issuing domain's point-of-contact server requests the assertion from the issuing domain's trust proxy (step 304), which generates the assertion (step 306); the issuing domain's trust proxy may request assistance from a trust broker to generate the required assertion if necessary. After generating the assertion, the issuing domain's trust proxy then returns the assertion to the issuing domain's point-of-contact server (step 308), which then injects the assertion into the output datastream in an appropriate manner (step 310), e.g., by inserting the assertion into an outgoing HTTP or SOAP message, thereby completing the process.

FIG. 3A depicts a process for creating an assertion at an issuing domain without the use of a "local wallet". However, the present invention allows for the inclusion of local wallet functionality. In general, a local wallet is client-side code that may act as a secure datastore for user attribute information or other information for facilitating transactions; the client-side code may also participate in the push and/or pull models of assertion transfer. When the local wallet actively participates in the protocol, it implements a subset of the functionality of the point-of-contact server functionality in terms of generating and inserting assertions into the protocol flow. Using a local wallet does not allow for the local wallet to implement the trust-based interactions that occur between a point-of-contact server and the trust proxy. In cases in which additional trust relationships are required, the point-of-contact server must be invoked.

With reference now to FIG. 3B, a flowchart depicts a generalized process at a relying domain for tearing down an assertion. The process begins when a relying domain's point-of-contact server receives a message with an associated assertion (step 322), after which it extracts the assertion and forwards the assertion to the relying domain's trust proxy (step 324). The relying domain's trust proxy extracts information from the assertion, including the token received from the issuing domain (step 326); the relying domain's trust proxy will invoke the security token service to validate this token, returning a locally valid token for the user if appropriate (step 328).

As part of step 326, the trust proxy will determine the source, i.e. issuing party, of the assertion. If the trust proxy is able to understand a trust assertion received from this issuing domain, the trust proxy will perform step 328 internally. If the trust proxy is not able to understand/trust assertions received from the issuing domain, the trust proxy may invoke assistance from a trust broker. If the assertion cannot be validated, then an appropriate error response would be generated.

Assuming that the assertion is validated, then the relying domain's trust proxy builds the local information that is required for the user (step 330). For example, the local information may include authentication credentials that are required by a back-end legacy application. The relying domain's trust proxy returns the required information to the relying domain's point-of-contact server (step 332), which builds a local session for the user.

After the point-of-contact server builds a session for user, the user appears as an authenticated user. The point-of-contact server can use this session information to further govern any transactions the user has with the domain until a logout or timeout event is initiated. Given that the point-of-contact server has an authenticated identity for the user, the point-of-contact server may obtain authorization for this request if necessary based on this particular user's identity and any authorization policies that are associated with this particular user. The point-of-contact server then forwards the user's request with any relevant information to the requested back-end application or service (step 334), thereby completing the process.

It should be noted that the data items that are transferred between the point-of-contact server and the trust proxy and the format of those data items may vary. Rather than extracting an assertion from the message and forwarding only the assertion to the trust proxy, the point-of-contact server may forward the entire message to the trust proxy. For example, the processing at the trust proxy may include steps like signature validation on a SOAP message, which would require the entire SOAP envelope.

With reference now to FIG. 3C, a flowchart depicts a specific process for pushing an assertion from an issuing domain to a relying domain in response to a user action at the issuing domain. The process begins when a user accesses a link to the relying domain from a Web page or similar resource within the issuing domain (step 342), thereby invoking some form of CGI-type (Common Gateway Interface) processing to build a particular assertion. The ability of the issuing domain to recognize the need for an assertion by the relying domain implies a tight integration with an existing legacy system on which the federated infrastructure of the present invention is implemented. It also implies a tight coupling between the issuing party and relying party such that the issuing party does not need to invoke a trust proxy to build the required assertion; this tight coupling may be appropriate between certain types of federated entities that have well-established trust relationships.

Back-end processing at the issuing domain is invoked to build the required assertion (step 344), which may include invoking functionality at the local trust proxy. The user's request to the relying domain, including the required assertion, is then built (step 346), and the issuing domain transfers the assertion along with the user's request to the relying domain (step 348), thereby completing the process. When the relying domain receives the request and its associated assertion, then the relying domain would validate the assertion in the manner shown in FIG. 3B.

With reference now to FIG. 3D, a flowchart depicts a specific process for pushing an assertion from an issuing domain to a relying domain in response to the issuing domain actively intercepting an outgoing request to the relying domain. The process begins when a user requests a protected resource at the relying domain (step 352). The point-of-contact server intercepts the outgoing request (step 354), e.g., by filtering outgoing messages for predetermined Uniform Resource Identifiers (URI's), certain types of messages, certain types of message content, or in some other manner. The issuing domain's point-of-contact server then requests the generation of an appropriate assertion from the issuing domain's trust proxy (step 356), which generates the assertion with assistance from a trust broker if necessary (step 358). The issuing domain then transfers the user's request along with the generated assertion to the relying party (step 360), thereby completing the process. When the relying domain receives the request and its associated assertion, then the relying domain would validate the assertion in the manner shown in FIG. 3B.

With reference now to FIG. 3E, a flowchart depicts a pull model in which a relying domain requests any required assertions for a user from an issuing domain while attempting to satisfy a resource request that was received by the relying domain from the requesting user. The process begins when the relying domain receives a user request for a protected resource (step 372). In contrast to the examples shown in FIG. 3C or FIG. 3D, the example that is shown in FIG. 3E describes the processing that is associated with a user's request that is received at a relying domain in absence of any required assertions about a user. In this case, the issuing domain has not had the ability to intercept or otherwise process the user's request in order to insert the required assertions in the user's request. For example, the user might have entered a Uniform Resource Locator (URL) or used a bookmarked reference to a resource in such a way that the outgoing request was not intercepted by an issuing domain's point-of-contact server. Hence, the relying domain requests the assertion from an issuing domain.

The relying domain then determines the user's home domain (step 374), i.e. the relevant issuing domain. In an HTTP-based implementation, the user may have pre-established a relationship with the relying domain that resulted in a persistent cookie being set by the relying domain at the user's client device. The persistent cookie would contain an identity of the user's home domain, i.e. issuing domain. In a SOAP-based implementation in which the user is operating a web services client in some manner, the web service at the relying domain would have advertised the services requirements via WSDL (Web Services Description Language), including token requirements. This would then require the user's web services client/SOAP implementation to provide the required token type. If this requirement was not fulfilled, then the web service would technically return an error. In some cases, it may return an error code that would allow the user's web services client to be prompted for authentication information so that the request could be repeated with the appropriate token.

The relying domain's point-of-contact server initiates an assertion request with the relying domain's trust proxy (step 376), which requests an assertion for the user from the issuing domain's trust proxy (step 378). If the embodiment is employing HTTP-based communication, then an assertion request from the relying domain's trust proxy to the issuing domain's trust proxy may be transmitted by the relying domain's point-of-contact server via redirection through the user's browser application to the point-of-contact server at the issuing domain, which forwards the assertion request to the issuing domain's trust proxy.

If the embodiment is employing a SOAP-based implementation, then the relying party may return an error code to the user's web service client. This error code allows the user to be prompted for authentication information by their web services client. The web services client would then generate the requested token. The user's web services client could invoke a trust proxy directly provided that the relying domain's trust proxy was advertised in a UDDI (Universal Description, Discovery, and Integration) registry, allowing the user's web services client to find the trust proxy. In general, this scenario is valid only for an internal user, where the trust proxy was advertised in a private UDDI within the enterprise because it is not likely that a trust proxy will be advertised in a public UDDI on the Internet or generally accessible outside of a federation.

The issuing domain's trust proxy generates (step 380) and then returns the requested assertion (step 382) in a manner that mirrors the manner in which the assertion request was received. After the relying domain's trust proxy receives the requested assertion (step 384), then the relying domain's trust proxy extracts information from the assertion (step 386) and attempts to interpret and/or validate the assertion (step 388); the trust proxy may invoke assistance from a trust broker if necessary for translation of the assertion. If the assertion cannot be validated, then an appropriate error response would be generated. Assuming that the assertion is validated, then the relying domain's trust proxy builds the local information in an appropriate format that is required for use by the back-end services that will attempt to fulfill the user's request for the protected resource (step 390). For example, the local information may include authentication credentials that are required by a back-end legacy application. The relying domain's trust proxy returns the required information to the relying domain's point-of-contact server (step 392), which then builds a local session for the user and forwards the user's request with any relevant information to the requested back-end application or service (step 394), thereby completing the process.

Single-sign-on within Federated Architecture

The description of FIGS. 2A–2D focuses on the operational characteristics of entities within a federated data processing environment in accordance with the present invention, whereas the description of FIGS. 3A–3E focuses on some of the processes that occur between those entities. In contrast to these descriptions, reference is made to FIG. 4 for a description of the present invention that focuses on the goals of completing transactions for a user while providing a single-sign-on experience for the user.

In other words, the description hereinbelow discusses the entities and processes that were already discussed above, although the following description focuses more on an overview perspective of the present invention with respect to the manner in which a user can have a single-sign-on experience within the user's session. A session can be defined as the set of transactions from (and including) the initial user authentication, i.e. logon, to logout. Within a session, a user's actions will be governed in part by the privileges granted to the user for that session. Within a federation, a user expects to have a single-sign-on experience in which the user completes a single authentication operation, and this authentication operation suffices for the duration of their session, regardless of the federation partners visited during that session.

During the user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

To facilitate a single-sign-on experience, web service that support the federated environment will also support using an authentication assertion or security token generated by a third-party to provide proof of authentication of a user. This assertion will contain some sort of evidence of the user's successful authentication to the issuing party together with an identifier for that user. Thus, a user may present traditional authentication credentials to one federation partner, e.g., username and password, and then provide a SAML authentication assertion that is generated by the authenticating/issuing party to a different federation partner.

Authentication in a web services environment is the act of verifying the claimed identity of the web services request so that the enterprise can restrict access to authorized clients. A user who requests or invokes a web service would almost always authenticated, so the need for authentication within the federated environment of the present invention is not any different from current requirements of web services for user authentication. The federated environment also allows web services or other applications to request web services, and these web services would also be authenticated.

Authentication of users that are not participating in a federated session are not impacted by the federated architecture of the present invention. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy component. The use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federated trust domain by recognizing an assertion that has been presented by the user as proof of authentication, such as an SAML authentication assertion, wherein the assertion has crossed between enterprise trust domains. The point-of-contact server may invoke the trust proxy, which in turn may invoke its security token service for validation of authentication credentials/security tokens.

Authentication of web services or other applications comprises the same process as authentication of users. Requests from web services carry a security token containing an authentication assertion, and this security token would be validated by the trust proxy/security token service in the same manner as a token presented by a user. A request from a web service should always carry this token with it because the web service would have discovered what authentication assertions/security tokens were required by the requested service as advertised in UDDI.

With reference now to FIG. 4, a block diagram depicts a federated environment that supports federated single-sign-on operations. User 400, through a client device and an appropriate client application, such as a browser, desires to access a web service that is provided by enterprise/domain 410, which supports data processing systems that act as a federated domain within a federated environment. Domain 410 supports point-of-contact server 412 and trust proxy 414; similarly, domain 420 supports point-of-contact server 422 and trust proxy 424, while domain 430 supports point-of-contact server 432 and trust proxy 434. The trust proxies rely upon trust broker 450 for assistance, as described above. Additional domains and trust proxies may participate in the federated environment. FIG. 4 describes a federated single-sign-on operation between domain 410 and domain 420; a similar operation may occur between domain 410 and domain 430.

The user completes an authentication operation with respect to domain 410; this authentication operation is handled by point-of-contact server 412. The authentication operation is triggered when the user requests access to some resource that requires an authenticated identity, e.g., for access control purposes or for personalization purposes. Point-of-contact server 412 may invoke a legacy authentication service, or it may invoke trust proxy 414 to validate the user's presented authentication credentials. Domain 410 becomes the user's home domain for the duration of the user's federated session.

At some later point in time, the user initiates a transaction at a federation partner, such as enterprise 420 that also supports a federated domain, thereby triggering a federated single-sign-on operation. For example, a user may initiate a new transaction at domain 420, or the user's original transaction may cascade into one or more additional transactions at other domains. As another example, the user may invoke a federated single-sign-on operation to a resource in domain 420 via point-of-contact server 412, e.g., by selecting a special link on a web page that is hosted within domain 410 or by requesting a portal page that is hosted within domain

410 but that displays resources hosted in domain 420. Point-of-contact server 412 sends a request to trust proxy 414 to generated a federation single-sign-on token for the user that is formatted to be understood or trusted by domain 420. Trust proxy 414 returns this token to point-of-contact server 412, which sends this token to point-of-contact server 422 in domain. Domain 410 acts as an issuing party for the user at domain 420, which acts as a relying party. The user's token would be transferred with the user's request to domain 420; this token may be sent using HTTP redirection via the user's browser, or it may be sent by invoking the request directly of point-of-contact server 422 (over HTTP or SOAP-over-HTTP) on behalf of the user identified in the token supplied by trust proxy 414.

Point-of-contact server 422 receives the request together with the federation single-sign-on token and invokes trust proxy 424. Trust proxy 424 receives the federation single-sign-on token, validates the token, and assuming that the token is valid and trusted, generates a locally valid token for the user. Trust proxy 424 returns the locally valid token to point-of-contact server 422, which establishes a session for the user within domain 420. If necessary, point-of-contact server 422 can initiate a federated single-sign-on at another federated partner.

Validation of the token at domain 420 is handled by the trust proxy 424, possibly with assistance from a security token service. Depending on the type of token presented by domain 410, the security token service may need to access a user registry at domain 420. For example, domain 420 may provide a binary security token containing the user's name and password to be validated against the user registry at domain 420. Hence, in this example, an enterprise simply validates the security token from a federated partner. The trust relationship between domains 410 and 420 ensures that domain 420 can understand and trust the security token presented by domain 410 on behalf of the user.

Federated single-sign-on requires not only the validation of the security token that is presented to a relying domain on behalf of the user but the determination of a locally valid user identifier at the relying domain based on information contained in the security token. One result of a direct trust relationship and the business agreements required to establish such a relationship is that at least one party, either the issuing domain or the relying domain or both, will know how to translate the information provided by the issuing domain into an identifier valid at the relying domain. In the brief example above, it was assumed that the issuing domain, i.e. domain 410, is able to provide the relying domain, i.e. domain 420, with a user identifier that is valid in domain 420. In that scenario, the relying domain did not need to invoke any identity mapping functionality. Trust proxy 424 at domain 420 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements. In the case of a direct trust relationship between two participants, the identifier translation algorithms will have been established for those two parties and may not be relevant for any other parties in the federation.

However, it is not always the case that the issuing domain will know how to map the user from a local identifier for domain 410 to a local identifier for domain 420. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 450. Identifier mapping rules and algorithms will have been established as part of this relationship, and the trust broker will use this information to assist in the identifier translation that is required for a brokered trust relationship.

Domain 420 receives the token that is issued by domain 410 at point-of-contract server 422, which invokes trust proxy 424 to validate the token and perform identity mapping. In this case, since trust proxy 424 is not able to map the user from a local identifier for domain 410 to a local identifier for domain 420, trust proxy 424 invokes trust broker 450, which validates the token and performs the identifier mapping. After obtaining the local identifier for the user, trust proxy 424, possibly through its security token service, can generate any local tokens that are required by the back-end applications at domain 420, e.g., a Kerberos token may be required to facilitate single-sign-on from the point-of-contact server to the application server. After obtaining a locally valid token, if required, the point-of-contact server is able to build a local session for the user. The point-of-contract server will also handle coarse-grained authorization of user requests and forward the authorized requests to the appropriate application servers within domain 420.

Consolidated Logoff within Federated Architecture

In the federated environment described above, a user's authentication information is passed across domains and heterogeneous environments. The user has a home domain, which is a domain that validates a user's authentication credentials. This home domain is then able to act as an issuing party to issue an assertion about the user that can be trusted and used in a different domain by a relying party. This assertion, when transferred from an issuing party to a relying party, is performed without user intervention and provides the user with a single-sign-on experience across disparate domains.

However, only part of securing a system is the requirement that a user complete an authentication operation, i.e. a logon or login operation, to prove their identity to the system. An equally important part of this process is the requirement that a user complete a logoff operation, i.e. a sign-off or sign-out operation, in order to end a secure session, thereby preventing other users from stealing or otherwise maliciously interfering with a valid session.

One difficult issue with a logoff operation is that one cannot predict where the user will decide to logoff. In other words, the user may interact with many domains within a federated single-sign-on session, and it is not possible to predict with which domain the user will be interacting when the user decides to logoff. As an example, the user may desire to logoff from the user's home domain. However, if the user invoked transactions such that the home domain performed single-sign-on operations at other domains, and one of those relying domains then acted as an issuing domain, then the user's home domain would not be aware of these domains and cannot invoke a logoff action at these domains on behalf of the user.

The present invention presents various approaches for a consolidated logoff operation within a federated environment. The present invention follows two general approaches for a consolidated logoff operation: one is based on HTTP and the other is based on SOAP. The HTTP approach may be performed in a "front-end" manner using HTTP redirection via the user's browser or a "back-channel" manner in which a logoff notice is sent directly to the point-of-contact server in federated domains without invoking the user's browser.

The SOAP approach is performed in a "back-channel" manner in which direct communication occurs between the federation components without invoking the user or the user's SOAP client. The SOAP approach may also use a publish-and-subscribe model, which allows relying domains to subscribe to logoff events which may occur. A user's home domain will then publish a logoff event for a user; this event will be received by all domains subscribed to such logoff events. The relying domain is then able to determine if the logoff event is relevant to the particular user, and if so, the relying domain effects a logoff or session purge of the user. An "optimized" approach to this logoff is to allow the relying domain to subscribe to logoff events at a finer granularity, i.e. logoff events specific to a particular user, so that the relying domain need not listen to all logoff events, only for logoff events for that particular user. Several preferred embodiments for a consolidated logoff operation are described hereinbelow with respect to the remaining figures.

Figure 5:
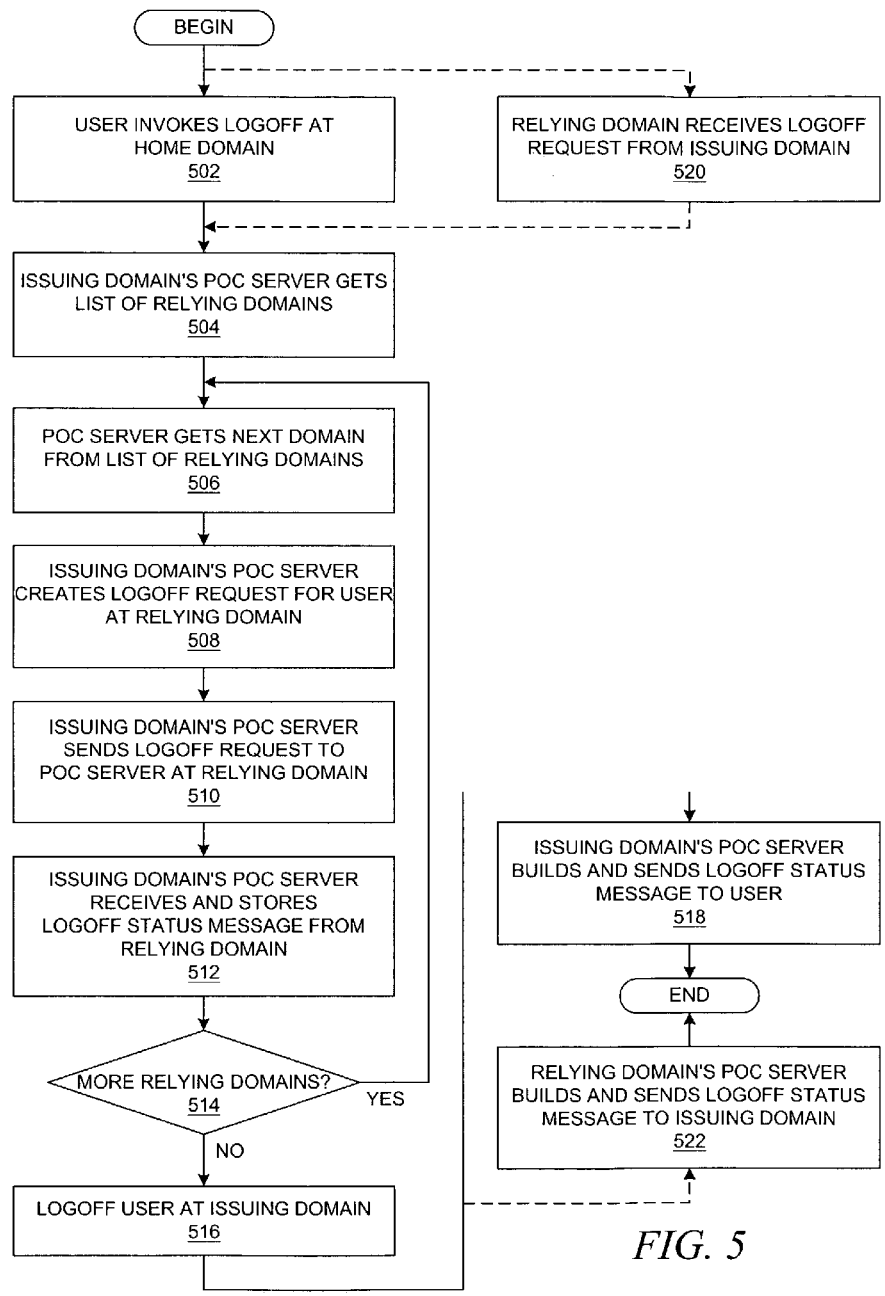
FIG. 5 depicts a flowchart that shows a process for performing a consolidated logoff operation among federated domains via HTTP redirections.

With reference now to FIG. 5, a flowchart depicts a process for performing a consolidated logoff operation among federated domains via HTTP redirections. The consolidated logoff operation shown in FIG. 5 begins at the user's home domain when a user invokes a logoff process (step 502) or when a user accesses a logoff resource, e.g., by selecting a logoff button on a web page; alternatively, the logoff operation could be initiated by the home domain for various reasons, such as an inactivity timeout.

The home domain may have acted as an issuing domain for a set of other federated domains; hence, the home domain may be referred to as an issuing domain within the process. The issuing domain gets a list of the relying domains to which it has sent authentication assertions during federated single-sign-on operations for the user (step 504). The issuing domain identifies a next relying domain from the list (step 506), and the issuing domain's point-of-contact server generates a logoff request message (with assistance from the issuing domain's trust proxy) for the user at the identified relying domain (step 508). The issuing domain's point-of-contact server sends the logoff request to the identified relying domain's point-of-contact server via HTTP redirection through the user's browser application (step 510). The issuing domain's point-of-contact server subsequently receives and stores a logoff status message from the identified relying domain's point-of-contact server via HTTP redirection through the user's browser application (step 512).

A determination is made as to whether or not there is another relying domain in the list of relying domains (step 514), and if so, the process branches back to step 506 to generate another logoff request. Otherwise, the issuing domain logs off the user at the issuing domain (step 516). The issuing domain's point-of-contact server then builds and sends a logoff status message to the user (step 518), which concludes the logoff process.

As noted above, the home domain may act as an issuing domain for a relying domain, which may itself act as an issuing domain for other downstream domains. Hence, when a relying domain gets a logoff request, it may perform the process that is shown in FIG. 5. At that point, the relying domain may then be regarded as an issuing domain with respect to steps 504–516. However, the process would begin and end differently. In order to initiate its logoff process, the relying domain receives a logoff request message from the issuing domain (step 520). In order to conclude its logoff process, the relying domain generates and returns a logoff response message to the issuing domain from which it received the logoff request message (step 522).

In an alternative embodiment, an issuing domain's point-of-contact server is able to send an HTTP message directly to the relying domain's point-of-contact server with the logoff request for the user. This requires that the relying domain's point-of-contact be able to receive this request and map the user identifier that is included in the request to a valid user session; this is handled "transparently" in the previous case because the user's session information goes "with" the user when the user interacts with the relying domain, e.g., an HTTP cookie that accompanies the logoff request. This alternative scenario does not completely logout the user if there are client-side session techniques used, such as a client-side cookie that is used to identify the user's session. The user's session would be terminated at the server side; the next time that the user attempts to access the server (assuming their client-side session token has not expired on its own), the server would need to explicitly expire this token. For example, when the server receives a client-side session cookie for which there is no matching session at the server, the server would respond with an error and would also reset the cookie to be invalid. In either case, the status message returned to the issuing domain's point-of-contact server is the same as that described with respect to step 522, and the status page returned to the user is the same as described with respect to step 518.

In another alternative embodiment, the logoff request operation uses SOAP over HTTP. In this scenario, the requests from an issuing domain's point-of-contact server to a relying domain's point-of-contact server uses SOAP-over-HTTP and does not invoke redirection via the user's browser. However, there would be more processing by the relying domain's point-of-contact server to match the logoff request and security token that is received from the issuing domain's point-of-contact server to the appropriate session information for the user at the relying domain's point-of-contact server. The logoff status messages and responses would be similar to that described in FIG. 5.

Figure 6:
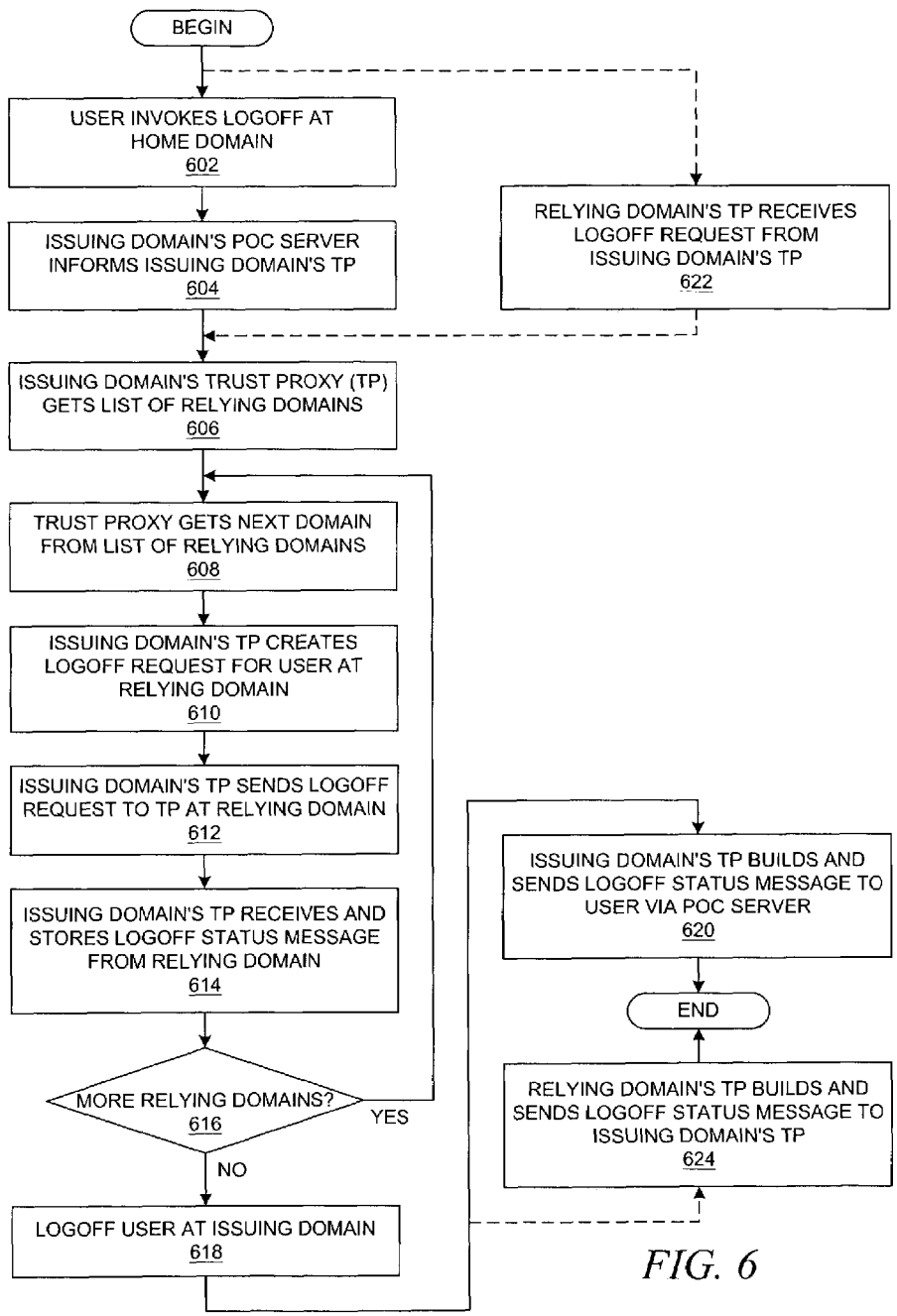
FIG. 6 depicts a flowchart that shows a process for performing a consolidated logoff operation among federated domains using the SOAP back-channel method.

With reference now to FIG. 6, a flowchart depicts a process for performing a consolidated logoff operation among federated domains using the SOAP back-channel method. The consolidated logoff operation shown in FIG. 6 begins at the user's home domain when a user invokes a logoff process (step 602) or when a user accesses a logoff resource, e.g., by selecting a logoff button on a web page; alternatively, the logoff operation could be initiated by the home domain for various reasons, such as an inactivity timeout. The home domain may have acted as an issuing domain for a set of other federated domains; hence, the home domain may be referred to as an issuing domain within the process.

The issuing domain's point-of-contact server informs the issuing domain's trust proxy of the logoff attempt (step 604). The trust proxy has maintained a record of all domains for which it has built federated single-sign-on tokens for this particular user during the user's session. The issuing domain's trust proxy gets a list of the relying domains to which it has sent authentication assertions during federated single-sign-on operations for the user (step 606). The issuing domain's trust proxy identifies a next relying domain from the list (step 608), and the issuing domain's trust proxy server generates a logoff request message for the user at the identified relying domain (step 610). The issuing domain's trust proxy then sends the logoff request to the identified relying domain's trust proxy (step 612). The issuing domain's trust proxy subsequently receives and stores a logoff status message from the identified relying domain's trust proxy (step 614).

A determination is made as to whether or not there is another relying domain in the list of relying domains (step 616), and if so, the process branches back to step 608 to generate another logoff request. Otherwise, the issuing domain's trust proxy logs off the user at the issuing domain (step 618). The issuing domain's trust proxy then builds and sends a logoff status message to the user via the point-of-contact server (step 620), which concludes the logoff process. It should be noted that, depending on the server that performs user session management, the trust proxy may need to build a local user token and initiate a logoff process at the point-of-contact server for the user in order to terminate a user's session.

As noted above, the home domain may act as an issuing domain for a relying domain, which may itself act as an issuing domain for other downstream domains. Hence, when a relying domain gets a logoff request, it may perform the process that is shown in FIG. 6. At that point, the relying domain may then be regarded as an issuing domain with respect to steps 604–618. However, the process would begin and end differently. In order to initiate its logoff process, the relying domain receives a logoff request message from the issuing domain (step 622). In order to conclude its logoff process, the relying domain generates and returns a logoff response message to the issuing domain from which it received the logoff request message (step 624). The logoff status messages and responses would be similar to that described in FIG. 6.

The SOAP approach may also use a publish-and-subscribe model. The present invention uses publish-and-subscribe technology to allow a logoff event handler to communicate to all servers to which the user has previously logged on in order to inform them that a logoff event has occurred. In contrast to the above-described approaches, with the publish-and-subscribe model, there is a single entity which has a record of, or a way to communicate with, all of the systems to which a user has logged on.

In a typical publish-and-subscribe environment, the relationship between a publisher and a subscriber generally is long-term and is applied to all events of a given "class", e.g., all logoff events or all logon events. The present invention describes a notion of ephemeral, context-specific, subscriber relationships. Due to the dynamic nature of a federated environment, scalable topologies support both ephemeral, context-specific events and long-term relationships.

In the present invention, a web service may subscribe to certain types of events, such as all logon notifications; a web service would subsequently need to subscribe to all logoff events in order to determine when any logged on sessions have been terminated. Hence, a web service would subscribe to all logoff events even though it is only interested in a specific subset of logoff events; this compares to logon events, where the web service must subscribe to all logon events because it is not possible to predict in advance which logon events would be of interest.

In addition, in the present invention, the publish-subscribe rules can be refined such that a web service has the ability to subscribe to context-specific events. Thus, in an example scenario, a particular web service would be notified that a subject user is authenticated. If the web service chooses to update its state to reflect this login event, then the web service would now be interested in subscribing to logoff events to determine if the user has logged off. Rather than forcing the web service to subscribe to all logoff events, the present invention allows the web service to subscribe to a context-specific event, i.e. the refinement of all logoff events to logoff events by the subject user. In this situation, the subscriber relationship between the web service, i.e. the relying party, and the trust proxy at the issuing domain, i.e. the publishing party, is short-lived, i.e. for the duration of the subject user's authenticated session.

In summary, an issuing domain acts as a publisher, and a relying domain acts as a subscriber, which allows relying domains to subscribe to logoff events which may occur at an issuing domain. A user's home domain would publish a logoff event for a user; this event will be received by all domains subscribed to such logoff events. The relying domain is then able to determine if the logoff event is relevant to the particular user, and if so, the relying domain effects a logoff or session purge of the user. An optimized approach to this logoff is to allow the relying domain to subscribe to logoff events at a finer granularity, i.e. logoff events specific to a particular user, so that the relying domain need not listen to all logoff events, only for logoff events for that particular user.

With reference now to FIGS. 7A–7B, a pair of flowcharts depict a pair of processes for performing a consolidated logoff operation among federated domains with a SOAP approach using a publish-and-subscribe model. The processes that are shown in FIG. 7A and FIG. 7B assume that a federated single-sign-on operation has already been completed on behalf of the user at a relying domain and that the relying domain has subscribed to logoff events for the user. For example, the point-of-contact server at the relying domain receives an authentication assertion from the point-of-contact server at the issuing domain along with an incoming request at the relying domain. As part of the processing that would occur at the relying domain, the trust proxy at the relying domain would subscribe to logoff events for the user. Referring to step 332 in FIG. 3B, after the trust proxy at the relying has validated the assertion from the issuing domain, the trust proxy would initiate the subscription operation; the trust proxy would use the user identifier that was received from the issuing domain and not a locally valid identifier within the relying domain because the identifier that would be included in the logoff events is the identifier that is published by the issuing domain.

The process that is shown in FIG. 7A occurs at an issuing domain, and the process that is shown in FIG. 7B occurs at a relying domain. Referring now to FIG. 7A, the process starts with a user initiating a logoff event at an issuing domain, such as the user's home domain (step 702). The issuing domain's point-of-contact server notifies the issuing domain's trust proxy (step 704), which determines all of the tokens that have been issued for the user during the user's session at the issuing domain (step 706). For each issued token, the issuing domain's trust proxy generates a SOAP-publish message with a logoff notification for each of the issued tokens (step 708), and the process is complete.

Referring now to FIG. 7B, the process starts with the trust proxy at a relying domain receiving the logoff message for the user (step 712). The relying domain's trust proxy creates a local security token for the user based on the received token within the logoff message (step 714). The relying domain's trust proxy then initiates a logoff operation on behalf of the user from the relying domain's point-of-contact server (step 716), and the process is complete. Alternatively, if the relying domain's trust proxy performs session management, then the relying domain's trust proxy would complete the logoff operation by terminating the user's session in an appropriate manner.

Referring again to FIG. 4, an example of a federated environment is used to explain a manner in which a user performs a consolidated logoff operation. The description of FIG. 4 above explains the manner in which user 400 completes federated single-sign-on operations to establish sessions at domains 420 and 430; in that example, domain 410 acts as a home domain, and domains 420 and 430 act as relying domains. The example hereinbelow continues from the end of the description of FIG. 4; in other words, the following example assumes that the user has already completed a federated single-sign-on operation and is proceeding to complete a consolidated logoff operation.

In this scenario, it may be assumed that the user's browser is not web-services enabled, i.e. does not act as a web services client. This implies that the user accesses the federation using HTTP. The federation components may communicate using SOAP or SOAP-over-HTTP. Communications between a point-of-contact server and a trust proxy may be internal, i.e. using an API, or over SOAP.

The following scenario follows the process that is shown in FIG. 5. User 400 logs out of domain 410. Point-of-contact server 412 maintains a list of all domains to which it has sent federated single-sign-on tokens on behalf of user 400. Before terminating the user's session at domain 410, point-of-contact server 412 creates a logoff request for the user at domain 420. In order to do so, point-of-contact server 412 requests a security token for user 400 valid in domain 420 from trust proxy 414. Point-of-contact server 412 builds the request to logoff user 400 at domain 420 includes the token received from 414; this token may be used to map the logout request to the user. This is less important in an HTTP scenario as this binding will also be a part of the user's session with point-of-contact server 422; this is more important in the SOAP scenarios as it allows binding of a request to a user.

Point-of-contact server 412 redirects this request to the point-of-contact server 422 in domain 420 via the user's browser. Point-of-contact server 422 receives the request and attempts to invoke a logoff for the user in domain 420. The result of this is success (user was authenticated and is now logged off with all session information deleted) or failure (user did not have a valid session) or error (user has session but possibly unable to complete logoff). Point-of-contact server 422 returns a status message to point-of-contact server 412 via HTTP direction through the user's browser. Point-of-contact server 412 then builds a logoff request for the user at domain 430. Point-of-contact server 412 redirects this request to the point-of-contact server 432 in domain 430 via the user's browser. Point-of-contact server 432 receives the request and attempt to invoke a logoff for the user in domain 430; the result of this will be success, failure, or error. Point-of-contact server 432 will return a status message to point-of-contact server 412 via HTTP redirection through the user's browser.

Figure 8A:
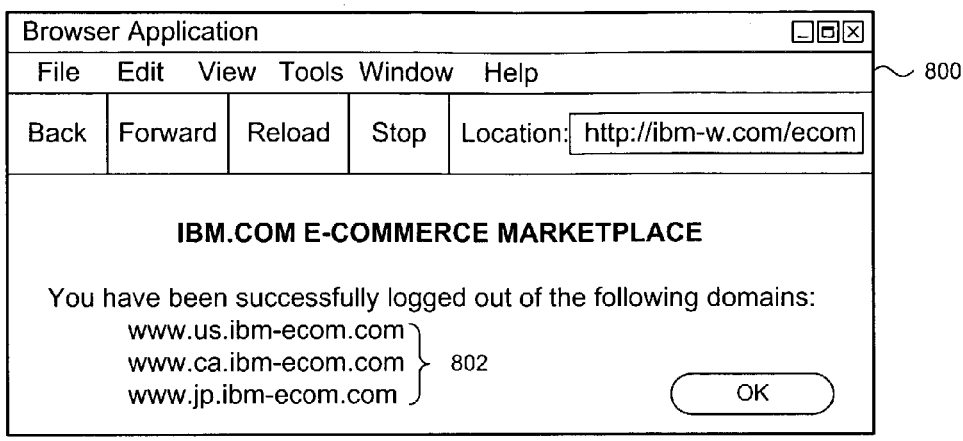
FIGS. 8A–8B depicts graphical user interface (GUI) windows that contain status messages from a consolidated logoff operation within a federation.

Point-of-contact server 412 at the user's home domain builds the logoff status message that is returned to the user's browser. If both domains 420 and 430 return a successful status indicator, then point-of-contact server 412 performs a logoff for the user in domain 410 and returns the message that is shown in FIG. 8A. If one or more of the federated domains do not return a successful status indicator, then in one embodiment, point-of-contact server 412 does not perform a logoff for the user at domain 410. Instead, point-of-contact server 412 returns the message that is shown in FIG. 8B.

Figure 8B:
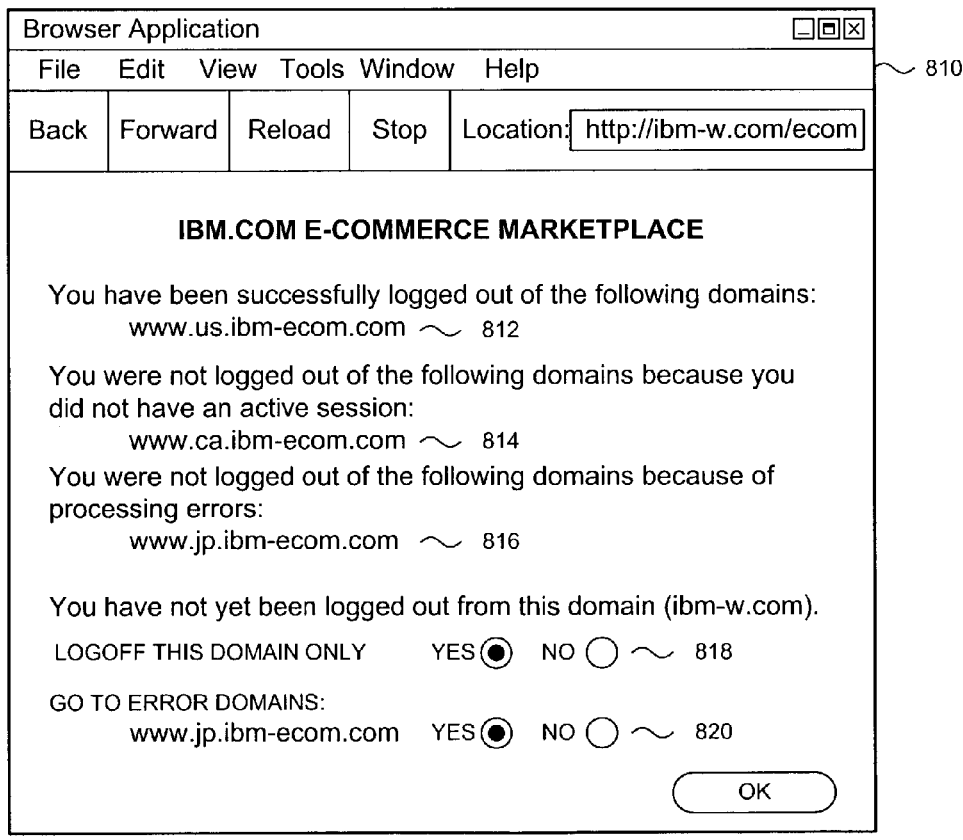

With reference now to FIGS. 8A–8B, graphical user interface (GUI) windows are shown that contain status messages from a consolidated logoff operation within a federation. Referring to FIG. 8A, window 800 shows the result of a successful consolidated logoff operation. In this example, names 802 of all of the domains that participated in the successful consolidated logoff operation are shown.

Referring to FIG. 8B, window 810 shows the status of the consolidated logoff operation with respect to each federated domain. Names 812 indicate those domains at which the user was successfully logged out. Names 814 indicate those domains at which a user did not have an active session; for example, the home domain may have performed a federated single-sign-on operation for the user at a domain, but the user subsequently logged out of that domain directly or was logged out due to inactivity, thereby leaving the home domain with an incorrect indication that the user would still have an active session at that domain. Names 816 indicate those domains at which an error occurred during the logout operation.

After reviewing the status of the consolidated logoff operation, the user is provided with options so that the user may choose what should occur with respect to concluding the consolidated logoff operation. In this example, the user may choose option 818 indicating that the user would like to continue to logoff from the home domain. The user may also choose options 820 to proceed to any domains at which errors were encountered during the consolidated logoff operation.

Referring again to FIG. 4, an example of a federated environment is used to explain a manner in which a user performs a consolidated logoff operation in accordance with the process that is shown in FIG. 6. User 400 sends a logoff request to point-of-contact server 412 (or directly to trust proxy 414 if the trust proxy is the component that the user talks to/maintains the user's state information). Point-of-contact server 412 builds a logoff request and requests a security token for the user from trust proxy 414, which maintains some sort of record of all domains for which it has built federated single-sign-on tokens for this user in this session. Trust proxy 414 builds a logoff request for the user at each of these domains and forwards this request to trust proxy 424 in domain 420 and trust proxy 434 in domain 430. The receiving trust proxy, e.g., trust proxy 424, receives the logoff request, verifies the user token, builds a local user token, and initiates a logoff request at point-of-contact server 422 for the user (or terminates the user's session at trust proxy 424, depending on which component performs session management).

Referring again to FIG. 4, an example of a federated environment is used to explain a manner in which a user performs a consolidated logoff operation in accordance with the process that is shown in FIGS. 7A–7B. In this scenario, when point-of-contact server 422 (or trust proxy 424) receives a logon request for user 400 from domain 410, trust proxy 424 initiates a "subscribe to logoff events"/"subscribe to logoff events for user 400". When the user initiates a logoff event at domain 410, point-of-contact server 412 builds a logoff notification to send to trust proxy 414, which determines all of the tokens it has issued for the user during this session and builds a SOAP-publish message with a logoff notification for each of the issued tokens.

For example, the token that was received at point-of-contact server 422 during a federated single-sign-on operation can be referred to as "token A", and the token that was received at point-of-contact server 432 during another federated single-sign-on operation can be referred to as "token B". Trust proxy 414 builds a SOAP-publish message with the logoff event and "token A" and a SOAP-publish message with the logoff event and "token B". Trust proxy 424 will have subscribed to SOAP logoff messages relevant to "token A" and will therefore receive the first message. Trust proxy 434 will have subscribed to SOAP logoff messages relevant to "token B" and will therefore receive the second message.

When trust proxy 424 receives a logoff message, it creates a local security token for the user based on the received token. Trust proxy 424 then requests a logoff on behalf of the user from point-of-contact server 422 (or it attempts to logoff from any locally maintained sessions for the user if the sessions are maintained at the trust proxy).

The advantages of the present invention should be apparent in view of the detailed description of the invention that is provided above. Prior art solutions organize domain security services into hierarchies, which requires the domains to have rigid trust relationships and intrinsically compatible technologies. Other approaches impose a uniform format on the authentication assertion or do not allow for the transfer of authentication assertions, sometimes transferring an authenticated identity from which a local assertion is built.

Among the advantages of the present invention, the trust proxies allow the pre-existing security services in a given domain to establish trust relationships with other domains without having to subscribe to the same trust root or use the same trust-establishment technology. Hence, the federated architecture of the present invention provides a loose coupling of entities. A home domain manages authentication, and each domain manages authentication of only its own registered users. Each domain is free to accept, reject, or modify any other domain's statements about user identity and attributes. A relying domain relies on an issuing domain's (ultimately, a home domain's) assertions of identity and attributes, yet each domain can implement any authentication protocol, and the applications within a given domain do not need to be modified to implement a previously unsupported protocol in order for the domain to participate in the federation. The federation does not require a particular trust model; a set of entities can form a federation that conforms to the trust model that the participating entities may have already established. Assertion translations occur only at the trust proxies and/or the trust brokers; the federation architecture acts as a front-end infrastructure that can be implemented with minimal impact on an existing legacy system.

Federations allow users to seamlessly traverse different sites within a given federation in a single-sign-on fashion. Because of the trust relationships established between the federation participants, one participant is able to authenticate a user and then act as an issuing party for that user. Other federation partners become relying parties, whereby they rely on information that is provided about the user by the issuing party without the direct involvement of the user. When a user desires to logoff from a domain, and that domain has acted as an issuing domain for the user, then the issuing domain initiates a consolidated logoff operation at any relying domains such that all domains that have an active federated single-sign-on session for the user are informed of the logoff operation and can terminate the user's session within those relying domains.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing user sessions within a distributed data processing system, the method comprising:

in response to determining to logoff a user on a system within a first domain, obtaining a list of domains at which the first domain has initiated a logon operation for the user by providing an authentication assertion;

generating at a system in the first domain a set of logoff request messages, wherein the set of logoff request messages contains a logoff request message for the user for each domain in the list of domains, wherein a logoff request message comprises an authentication assertion for the user; and sending a logoff request message from a system in the first domain to each domain in the list of domains.

2. The method of claim 1 further comprising:

receiving at a system in the first domain a logoff request message from a system in a second domain to initiate a logoff operation for the user; and determining to logoff the user based on the request from a system in the second domain.

3. The method of claim 2 wherein a logoff request message is a SOAP (Simple Object Access Protocol) publish message.

4. The method of claim 3 wherein a system in the first domain has subscribed to logoff events.

5. The method of claim 3 wherein a system in the first domain has subscribed to logoff events that are specifically for the user.

6. The method of claim 1 further comprising:
extracting an authentication assertion from a logoff request message at a pointofcontact server within the first domain; and
forwarding the extracted authentication assertion to a trust proxy within the first domain.

7. The method of claim 6 further comprising:
in response to validating the extracted authentication assertion, returning to the point of-contact server a local security token that is valid within the first domain.

8. The method of claim 7 further comprising:
in response to a determination of an inability to validate the extracted authentication assertion at the trust proxy, requesting a trust broker to validate the extracted authentication assertion.

9. The method of claim 1 further comprising:
receiving at a system in the first domain a request from a client operated by the user to initiate a logoff operation; and
determining to logoff the user based on the request from the user.

10. The method of claim 1 wherein the user accesses a logoff resource at a system in the first domain.

11. The method of claim 1 wherein a logoff request message is generated by a point-of-contact server within a federated domain.

12. The method of claim 1 wherein a logoff request message is generated by a trust proxy server within a federated domain.

13. A data processing system for managing user sessions, the data processing system comprising:
means for obtaining a list of domains at which the first domain has initiated a logon operation for the user by providing an authentication assertion in response to determining to logoff a user on a system within a first domain;
means for generating at a system in the first domain a set of logoff request messages, wherein the set of logoff request messages contains a logoff request message for the user for each domain in the list of domains, wherein a logoff request message comprises an authentication assertion for the user; and
means for sending a logoff request message from a system in the first domain to each domain in the list of domains.

14. The data processing system of claim 13 further comprising:
means for receiving at a system in the first domain a logoff request message from a system in a second domain to initiate a logoff operation for the user; and
means for determining to logoff the user based on the request from a system in the second domain.

15. The data processing system of claim 14 wherein a logoff request message is a SOAP (Simple Object Access Protocol) publish message.

16. The data processing system of claim 15 wherein a system in the first domain has subscribed to logoff events.

17. The data processing system of claim 15 wherein a system in the first domain has subscribed to logoff events that are specifically for the user.

18. The data processing system of claim 13 further comprising:
means for extracting an authentication assertion from a logoff request message at a point-of-contact server within the first domain; and
means for forwarding the extracted authentication assertion to a trust proxy within the first domain.

19. The data processing system of claim 18 further comprising:
means for returning to the point-of-contact server a local security token that is valid within the first domain in response to validating the extracted authentication assertion.

20. The data processing system of claim 19 further comprising:
means for requesting a trust broker to validate the extracted authentication assertion in response to a determination of an inability to validate the extracted authentication assertion at the trust proxy.

21. The data processing system of claim 13 further comprising:
means for receiving at a system in the first domain a request from a client operated by the user to initiate a logoff operation; and
means for determining to logoff the user based on the request from the user.

22. The data processing system of claim 13 wherein the user accesses a logoff resource at a system in the first domain.

23. The data processing system of claim 13 wherein a logoff request message is generated by a point-of-contact server within a federated domain.

24. The data processing system of claim 13 wherein a logoff request message is generated by a trust proxy server within a federated domain.

25. A computer program product in a computer readable medium for managing user sessions in a data processing system, the computer program product comprising:
means for obtaining a list of domains at which the first domain has initiated a logon operation for the user by providing an authentication assertion in response to determining to logoff a user on a system within a first domain;
means for generating at a system in the first domain a set of logoff request messages, wherein the set of logoff request messages contains a logoff request message for the user for each domain in the list of domains, wherein a logoff request message comprises an authentication assertion for the user; and
means for sending a logoff request message from a system in the first domain to each domain in the list of domains.

26. The computer program product of claim 25 further comprising:
means for receiving at a system in the first domain a logoff request message from a system in a second domain to initiate a logoff operation for the user; and
means for determining to logoff the user based on the request from a system in the second domain.

27. The computer program product of claim 26 wherein a logoff request message is a SOAP (Simple Object Access Protocol) publish message.

28. The computer program product of claim 27 wherein a system in the first domain has subscribed to logoff events.

29. The computer program product of claim 27 wherein a system in the first domain has subscribed to logoff events that are specifically for the user.

30. The computer program product of claim 25 further comprising:
- means for extracting an authentication assertion from a logoff request message at a point-of-contact server within the first domain; and
- means for forwarding the extracted authentication assertion to a trust proxy within the first domain.

31. The computer program product of claim 30 further comprising:
- means for returning to the point-of-contact server a local security token that is valid within the first domain in response to validating the extracted authentication assertion.

32. The computer program product of claim 31 further comprising:
- means for requesting a trust broker to validate the extracted authentication assertion in response to a determination of an inability to validate the extracted authentication assertion at the trust proxy.

33. The computer program product of claim 25 further comprising:
- means for receiving at a system in the first domain a request from a client operated by the user to initiate a logoff operation; and
- means for determining to logoff the user based on the request from the user.

34. The computer program product of claim 25 wherein the user accesses a logoff resource at a system in the first domain.

35. The computer program product of claim 25 wherein a logoff request message is generated by a point-of-contact server within a federated domain.

36. The computer program product of claim 25 wherein a logoff request message is generated by a trust proxy server within a federated domain.

* * * * *